United States Patent
Kawasaki et al.

(10) Patent No.: US 10,675,720 B2
(45) Date of Patent: Jun. 9, 2020

(54) HIGH CR NI-BASED ALLOY WELDING WIRE, SHIELDED METAL ARC WELDING ROD, AND WELD METAL FORMED BY SHIELDED METAL ARC WELDING

(75) Inventors: Kenji Kawasaki, Tokyo (JP); Seiichi Kawaguchi, Tokyo (JP); Masahiko Toyoda, Tokyo (JP); Seiji Asada, Tokyo (JP); Akira Konishi, Arlington, VA (US); Yusuke Sano, Tokyo (JP); Tamao Takatsu, Tokyo (JP); Teiichiro Saito, Tokyo (JP); Tetsuya Sango, Tokyo (JP); Norihito Ogawa, Tokyo (JP)

(73) Assignees: MITSUBISHI HEAVY INDUSTRIES, LTD., Tokyo (JP); NIPPON WELDING ROD CO., LTD., Tokyo (JP)

( * ) Notice: Subject to any disclaimer, the term of this patent is extended or adjusted under 35 U.S.C. 154(b) by 1213 days.

(21) Appl. No.: 13/982,878

(22) PCT Filed: Jan. 27, 2012

(86) PCT No.: PCT/JP2012/051837
§ 371 (c)(1),
(2), (4) Date: Oct. 3, 2013

(87) PCT Pub. No.: WO2012/105452
PCT Pub. Date: Aug. 9, 2012

(65) Prior Publication Data
US 2014/0305921 A1   Oct. 16, 2014

(30) Foreign Application Priority Data
Feb. 1, 2011   (JP) .................. 2011-020062

(51) Int. Cl.
*B23K 35/34*   (2006.01)
*B23K 35/30*   (2006.01)
(Continued)

(52) U.S. Cl.
CPC ........ *B23K 35/304* (2013.01); *B23K 35/0261* (2013.01); *B23K 35/30* (2013.01); *B23K 35/3033* (2013.01); *C22C 19/05* (2013.01)

(58) Field of Classification Search
CPC ............... B23K 35/0261; B23K 35/30; B23K 35/3033; B23K 35/304; C22C 19/05
(Continued)

(56) References Cited

U.S. PATENT DOCUMENTS

| 4,400,209 A | * | 8/1983 | Kudo | ................... | C22C 19/052 |
| | | | | | 420/443 |
| 4,840,768 A | * | 6/1989 | Domian | .................. | C22C 30/00 |
| | | | | | 420/582 |

(Continued)

FOREIGN PATENT DOCUMENTS

| JP | H06-089426 A | 3/1994 |
| JP | 07316700 A | 12/1995 |

(Continued)

OTHER PUBLICATIONS

Communication and European Search Report issued in corresponding European Patent Application No. 12742169.1; dated Oct. 26, 2015.

(Continued)

*Primary Examiner* — Christopher S Kim
(74) *Attorney, Agent, or Firm* — Pearne & Gordon LLP

(57) ABSTRACT

Provided is a high Cr Ni-based alloy welding wire with which tensile strength and weld cracking resistance of a welded portion, the integrity of the microstructure of a welded metal, and inhibition of scale generation are (Continued)

improved. The high Cr Ni-based alloy welding wire is configured to have an alloy composition comprising, by mass, C: 0.04% or less, Mn: 7% or less, Fe: 1 to 12%, Si: 0.75% or less, Al: 0.01 to 0.7%, Ti: 0.01 to 0.7%, Cr: 25.0 to 31.5%, Ta: 1 to 10%, and Mo: 1 to 6%, and as inevitable impurities, Ca+Mg: less than 0.002%, N: 0.1% or less, P: 0.02% or less, O: 0.01% or less, S: 0.0015% or less, H: 0.0015% or less, Cu: 0.08% or less, and Co: 0.05% or less, and the balance: Ni. Then, the high CrNi-based alloy welding wire is configured such that the contents of S, Ta, Al, and Ti satisfy the following relation (1) and the contents of Ta, Mo, and N satisfy the following relation (2):

$$12000S + 0.58Ta - 2.6Al - 2Ti \pounds 19.3 \quad (1)$$

$$Ta + 1.6Mo + 187N^3 \mathsterling 5.7 \quad (2).$$

9 Claims, 8 Drawing Sheets

(51) Int. Cl.
  *B23K 35/02* (2006.01)
  *C22C 19/05* (2006.01)
(58) Field of Classification Search
  USPC .................................................. 219/146.22
  See application file for complete search history.

(56) References Cited

U.S. PATENT DOCUMENTS

| | | | |
|---|---|---|---|
| 6,242,113 B1 | 6/2001 | Kiser | |
| 6,674,047 B1* | 1/2004 | Hughes | B23K 35/0266 219/145.22 |
| 6,860,948 B1* | 3/2005 | Pike, Jr. | C22C 1/0433 148/427 |
| 6,953,508 B2* | 10/2005 | Ikeda | B23K 9/18 148/320 |
| 7,755,001 B2 | 7/2010 | Nakajima | B23K 35/304 219/137 WM |
| 7,799,152 B2* | 9/2010 | Kanzaki | C22C 19/053 148/677 |
| 8,764,918 B2* | 7/2014 | Hara | B23K 35/30 148/330 |
| 9,589,694 B2* | 3/2017 | Sarangapani | C22C 9/00 |
| 9,657,373 B2* | 5/2017 | Hattendorf | C22C 19/055 |
| 2003/0118469 A1* | 6/2003 | Kubota | C22C 19/053 420/443 |
| 2004/0062677 A1* | 4/2004 | Chabenat | C22C 19/055 420/448 |
| 2004/0115086 A1* | 6/2004 | Chabenat | B23K 35/304 420/452 |
| 2006/0191606 A1* | 8/2006 | Ogawa | B23K 9/173 148/327 |
| 2007/0187379 A1 | 8/2007 | Osuki et al. | |
| 2007/0272671 A1* | 11/2007 | Nakajima | B23K 35/304 219/146.22 |
| 2008/0241580 A1 | 10/2008 | Kiser et al. | |
| 2010/0136368 A1* | 6/2010 | Kiser | B23K 35/304 428/680 |
| 2010/0212785 A1* | 8/2010 | Takasawa | C21D 1/28 148/547 |
| 2011/0240715 A1 | 10/2011 | Rebak et al. | |
| 2012/0267420 A1* | 10/2012 | Cheney | B22F 5/12 228/101 |
| 2015/0093288 A1* | 4/2015 | Hattendorf | C22C 19/053 420/443 |
| 2016/0144461 A1 | 5/2016 | Kiser et al. | |

FOREIGN PATENT DOCUMENTS

| | | |
|---|---|---|
| JP | 3170165 B2 | 3/2001 |
| JP | 3170166 B2 | 3/2001 |
| JP | 2003-501557 A | 1/2003 |
| JP | 2003-311473 A | 11/2003 |
| JP | 2004-197150 A | 7/2004 |
| JP | 2005059077 A | 3/2005 |
| JP | 2005118875 A | 5/2005 |
| JP | 3747729 B2 | 2/2006 |
| JP | 3957261 B2 | 8/2007 |
| JP | 2009-022989 A | 2/2009 |
| JP | 2010-500178 A | 1/2010 |
| JP | 2010-036223 A | 2/2010 |
| JP | 4546318 B2 | 9/2010 |
| WO | 00/76718 A1 | 12/2000 |
| WO | 2005/070612 A1 | 8/2005 |
| WO | 2006/013727 A1 | 2/2006 |
| WO | 2006081258 A2 | 8/2006 |
| WO | 2008/021650 A2 | 2/2008 |

OTHER PUBLICATIONS

Collins, M.G.; Ramirez, A.J; and Lippold, C.J., "An Investigation of Ductility Dip Cracking in Nickel-Based Weld Metals", Welding Journal, Dec. 2003, pp. 348S-354S.
American Welding Society: "Specification for Nickel and Nickel-Alloy Bare Welding Electrodes and Rods", AWS A5.14/A5/14M: 2009 an American National Standard Institute.
International Search Report for Application No. PCT/JP2012/051837 dated Apr. 3, 2012.
AWS A5 Committee, "AWS A5.14/A5.14M:2011, An American National Standard, Specification for Nickel and Nickel-Alloy Bare Welding Electrodes and Rods", American Welding Society, 10th Edition, 2011, PDF pp. 1-44.
Zhang et al., "A new NiCrFe welding product INCONEL FM52MSS provides optimum resistance to PWSCC and DDC," Special Products Company (2010), pp. 1-13, available at http://selector.specialmetalswelding.com/publica/PSA10_021_Kiser.pdf, last accessed Jan. 29, 2020 (this reference corresponds to Annex 1 in the Declaration of Inventor Norihito Ogawa).
Kiser et al., "A New Welding Material for Improved resistance to Ductility Dip Cracking," Special Products Company (2008), pp. 1-6, available at https://www.pccenergy.com/assets/files/trend-paper-2008.pdf, last accessed Jan. 29, 2020 (this reference corresponds to Annex 2 in the Declaration of Inventor Norihito Ogawa).

* cited by examiner

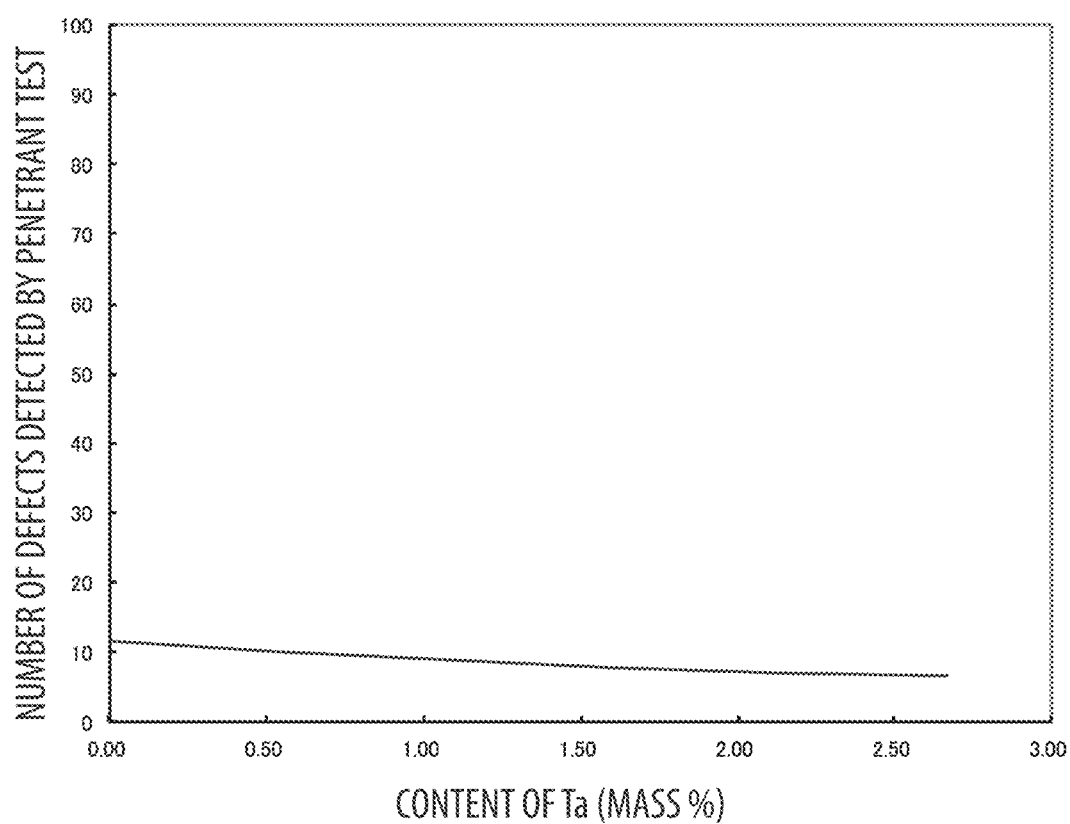

HIGH CR NI-BASED ALLOY WELDING WIRE, SHIELDED METAL ARC WELDING ROD, AND WELD METAL FORMED BY SHIELDED METAL ARC WELDING

TECHNICAL FIELD

The present invention relates to a high Cr Ni-based alloy welding wire, a shielded metal arc welding rod, and a weld metal formed by shielded metal arc welding that are used for welding in a pressurized water reactor type nuclear power plant or the like which operates at a high temperature.

BACKGROUND ART

A high Cr Ni-based alloy welding material disclosed in each of the following Patent Documents 1 to 9 and the following Non-Patent Document 1 has been known, as a high Cr Ni-based alloy welding material to be used for a member of a steam generator in a pressurized water reactor type nuclear power plant that operates at a high temperature of 300 to 350° C., or the like.

Patent Documents 1 and 2 each discloses a technology for improving a high temperature strength characteristic by adding N.

Patent Document 3 discloses a technology for reducing hot cracking, cold cracking, root cracking, and stress corrosion cracking and also obtaining desired strength and desired corrosion resistance by reducing contents of Al and Ti and addition of Nb.

Patent Document 4 discloses a technology for reducing scale on a weld bead surface and increasing weld cracking resistance by reducing contents of Al and Ti and adding Ta in place of Nb.

Patent Document 5 discloses a technology for reducing various types of cracking including ductility-dip cracking when build-up welding is performed on a SUS304 steel plate, by addition of Mo and Nb+Ta.

Patent Document 6 discloses a technology for reducing stress corrosion cracking, solidification cracking, ductility-dip cracking, and root cracking and obtaining desired strength by addition of Mo and Nb+Ta, and further addition of a trace of Ca+Mg.

Patent Document 7 discloses a technology for eliminating the need for a stabilization process by addition of Nb, and preventing reduction of corrosion resistance and reduction of weldability due to S, by addition of Mn.

Patent Document 8 discloses a technology for obtaining an alloy excellent in metal dusting resistance by addition of Cu, Nb, Ta, Mo, and the like to a high Cr Ni-based alloy.

Patent Document 9 discloses a technology for improving weld cracking resistance and hot workability of the wire by addition of Nb and Mn and adjustment of the content of Nb+Mn.

Non-Patent Document 1 discloses a technology about ductility-dip cracking generated in a Ni-based alloy welded metal (Ni-based alloy 82 and Ni-based alloy 52). Non-Patent Document 2 discloses the chemical composition of a high Ni-based alloy welding material specified by each of the standard by the American Welding Society (AWS) and the standard by the American National Standard Institute (ANSI).

PRIOR ART DOCUMENTS

Patent Documents

Patent Document 1: JP 3170166
Patent Document 2: JP 3170165
Patent Document 3: JP 2003-501557A
Patent Document 4: WO 2005/070612
Patent Document 5: US 2004/0115086A1
Patent Document 6: WO 2008/021650A2
Patent Document 7: JP 06-89426A
Patent Document 8: JP 2004-197150A
Patent Document 9: JP 2009-22989A
Non-Patent Document 1: M. G. COLLINS, A. J. RAMIREZ, AND J. C. LIPPOLD Welding Journal, December 2003. 348S~
Non-Patent Document 2: American Welding Society "Specification for Nickel and Nickel-Alloy Bare Welding Electrodes and Rods" AWS A5.14/A5.14M: 2009 An American National Standard Institute.

OVERVIEW OF THE INVENTION

Technical Problem

In a welded metal portion of a welded portion in a device that operates at a high temperature of 300 to 350° C., high temperature strength comparable to that of a base material is demanded. In a conventional welded joint of Ni-based alloy 690, high temperature strength of a welded metal may be reduced than that of a base material. Consequently, it has become a challenge to develop a welding material that exhibits higher reliability in terms of stabilization of high temperature strength. In the technology disclosed in each of Patent Documents 1 and 2 described above, high temperature strength is improved by strengthening a solid solution using N. However, solubility of N in the Ni-based alloy is extremely low. Thus, addition of N beyond the limit of the solubility may cause generation of a pore in the welded metal. Further, this technology may promote deposition of a nitride such as TIN, and may also cause reduction of ductility of the welded metal. Thus, there is a limit to improvement in the strength by addition of N.

The technology disclosed in Patent Document 3 is the one for improving the stress corrosion cracking and weld cracking susceptibility by addition of Nb. The technology disclosed in Patent Document 6 is the one for improving the stress corrosion cracking and weld cracking susceptibility by addition of Mo and Nb Ta. Though each of Patent Documents 3 and 6 describes about the strength, the strength is not specifically disclosed in its embodiment example.

The inventions of Patent Documents 4, 5, 7, 8, and 9 do not disclose about strength at all. The structure of the high Cr Ni-based alloy is a complete austenite structure of low solubility with respect to an impurity element such as P or S, and is used for welding of a thick structural member with a high reaction stress in an actual device. Thus, excellent weld cracking resistance is demanded for this type of welding material. In the high Cr Ni-based alloy, S, which has an extremely low solubility in the austenite structure, very markedly affects weld cracking susceptibility. The reaction stress of a welding wire including a conventional level of S increases when performing welding of the thick structural member. Thus, a micro-crack is generated in a welded portion when a bend test is conducted.

In the technology of each of Patent Documents 1 to 9, an upper limit of the content of S is set in order to obtain the weld cracking resistance. However, it is not adequate to set the upper limit in view of the welding work of the thick structural member. On the other hand, the content of Mn that tends to combine with S may be increased in shielded metal arc welding, according to the Boiler and Pressure Vessel Code of the American Society of Mechanical Engineers (ASME). Thus, S may be fixed as MnS having a high melting point, and an adverse effect on a weld cracking due to grain boundary segregation of S may be thereby reduced. Accordingly, a limiting value for the content of S shielded metal arc welding may be relaxed more than that in a TIG welding wire. In the austenite structure, H has a high solubility, and has a small diffusion rate. Thus, there is no concern about delayed cracking or the like of the welded metal of a ferrite-based structure due to diffusive hydrogen. However, hydrogen embrittlement cannot be ignored in a portion of the Ni-based alloy where stress corrosion cracking or ductility-dip cracking poses a problem. Accordingly, hydrogen embrittlement resistance is also demanded. His mixed into the wire due to attachment of a lubricant to a surface of the wire or the like when the wire is melted or drawn. In the shielded metal arc welding, H is mixed into the wire from a flux as well. Detailed observation of the microstructure of the welded metal has shown that, when the content of H exceeds a certain value, a microvoid is generated at a grain boundary as an initial state of stress corrosion cracking or ductility-dip cracking. With the high Cr Ni-based alloy filler material disclosed in Patent Document 4, there is a limit to reducing scale on the weld bead surface to be generated during TIG welding. A portion of a welding material (composition range of elements of ERNiCrFe-13) standardized by the AWS in Non-Patent Document 2 is shown in Table 1. In actual production of the welding material, optimization of contents of elements such as Nb, Ta, Mo, Al, Ti, Mg, Ca and allowances for contents of inevitable impurities to be mixed into the welding material when the wire is drawn or produced by melting should be adequately studied. Otherwise, practical application of the welding material is impossible.

In the present invention, the contents of S, Ta, Al, Ti, Mo, and N satisfy the following relations (1) and (2):

$$12000S+0.58Ta-2.6Al-2Ti \leq 19.3 \quad (1)$$

$$Ta+1.6Mo+187N \geq 5.7 \quad (2).$$

Inventors of the present invention have studied a condition of the high Cr Ni-based alloy welding wire for improving tensile strength and weld cracking resistance of a welded portion, the integrity of the microstructure of a welded metal, and welding performance. The welded metal is a metal of the welded portion where the welding wire and a base material are melted. As a result of the study, the inventors have found a relationship between improvement in the weld cracking resistance and the contents of S, Ta, Al and Ti is established by the above relation (1) and a relationship between improvement in the tensile strength of the welded portion and the contents of Ta, Mo, and N is established by the above relation (2), in addition to the above-mentioned chemical composition of Ta and the like. By configuring the welding wire to have the above-mentioned chemical composition and to satisfy the above-mentioned relations (1) and (2), there may be provided the high Cr Ni-based alloy welding wire which achieves excellent tensile strength and excellent weld cracking resistance of the welded portion and improvement in the integrity of the microstructure of the welded metal and improvement in welding performance. The calculated value of the above relation (1) is set to 19.3 or less. The smaller the calculated value of the above relation (1) is, the more the weld cracking resistance tends to increase. For that reason, the calculated value of the above relation (1) may be set to be 13 or less in order to obtain remarkable weld cracking resistance.

TABLE 1

| AWS Standards for Ni-Based Alloy Welding Wire (Mass %) | | | | | | | | |
|---|---|---|---|---|---|---|---|---|
| Standards | C | Mn | Fe | P | S | Si | Cu | Ni |
| AWS A5.14 ERNiCrFe-13 | 0.03 or less | 1.0 or less | Rem. | 0.02 or less | 0.015 or less | 0.50 or less | 0.30 or less | 52.0-62.0 |
| | Al | Ti | Cr | Nb + Ta | Mo | Co | B | Zr |
| | 0.50 or less | 0.50 or less | 28.5-31.0 | 2.1-4.0 | 3.0-5.0 | 0.10 or less | 0.003 or less | 0.02 or less |

In view of the actual situation described above, an object of the present invention is to provide a high Cr Ni-based alloy welding wire with which tensile strength and weld cracking resistance of a welded portion, the integrity of the microstructure of a welded metal, and welding performance are improved.

Another object of the present invention is to provide a high Cr Ni-based alloy shielded metal arc welding rod and a weld metal formed by shielded metal arc welding, which achieve improvement in tensile strength and weld cracking resistance of a welded portion and improvement in the integrity of the microstructure of a welded metal.

Solution to Problem

A high Cr Ni-based alloy welding wire of the present invention comprises, by mass, C: 0.04% or less, Mn: 7% or less, Fe: 1 to 12%, Si: 0.75% or less, Al: 0.01 to 0.7%, Ti: 0.01 to 0.7%, Cr: 25.0 to 31.5%, Ta: 1 to 10%, Mo: 1 to 6%, and N: 0.1% or less, and as inevitable impurities, P: 0.02% or less, O: 0.01% or less, S: 0.0015% or less, H: 0.0015% or less, Cu: 0.08% or less, and Co: 0.05% or less, and the balance: Ni.

The inventors have found that, in a conventional high Cr Ni-based alloy welding wire mainly comprising Nb and Ta as group V elements, Ta improves performance such as strength, without reducing weld cracking resistance, while presence of Nb added in order to improve the weld cracking resistance remarkably reduces the weld cracking resistance. Nb (niobium) is an element for generating a compound with carbon and nitrogen and then increasing corrosion resistance. An effect of increasing strength may also be obtained from the use of Nb, due to deposition strengthening and solid solution strengthening. The study of the inventors, however, has revealed that, although weld cracking susceptibility during build-up welding on a SUS 304 plate tends to increase as the content of Nb increases, the weld cracking susceptibility does not tend to increase but slightly decrease as the content of Ta increases. Then, by adopting the chemical composition including only Ta (not including Nb) as the group V element as in the present invention, a high Cr Ni-based welding wire that achieves excellent weld cracking resistance in particular may be provided.

A description will be given below about an effect expected for each element included in the high Cr Ni-based alloy welding wire of the present invention and the reason for limiting the content of each element.

C (carbon) is an element for strengthening a solid solution. With an increase in the content of C, the tensile strength increases. However, when the content of C exceeds 0.04 mass %, stress corrosion cracking resistance decreases. The content of C is therefore set to 0.04 mass % or less in view of these respects. Preferably, the lower limit of the content of C is set to 0.006 mass % in order to obtain the effect of increasing the tensile strength. It is assumed in this application that 0 mass % is not included in the mass % or less.

Mn (manganese) exerts deoxidation and desulfurization actions during welding. Mn fixes harmful S which may cause a weld hot cracking thereby reducing weld cracking susceptibility. However, when the welding wire includes Mn whose content exceeds 7 mass %, slag fluidity is reduced during the welding, resulting in reduced welding performance. Thus, the content of Mn is set to 7 mass % or less. The content of Mn in a welding wire is prescribed to be 1.0 mass % or less in the Boiler and Pressure Vessel Code of the ASME. However, preferably, the lower limit of the content of Mn is set to 0.05 mass % in order to obtain the effect of reducing a weld hot cracking.

Fe (iron) is effective for stabilizing a metal structure at high temperature, and reduces aging embrittlement. Thus, it is necessary to include content of Fe of 1% or more. However, when the content of Fe exceeds 12 mass %, ductility-dip cracking occurs due to grain boundary carbide deposition, thereby reducing the corrosion resistance and the stress corrosion cracking resistance. Accordingly, the content of Fe is set to 1 to 12 mass %.

Though Si (silicon) exerts a deoxidation effect and increases the fluidity during the welding, weld hot cracking susceptibility increases when the content of Si increases. Thus, the content of Si is set to 0.75 mass % or less. Preferably, the lower limit of the content of Si is set to 0.05 mass % in order for Si to exert the deoxidation effect and to increase the fluidity.

Al (aluminum) is mainly used as a deoxidation agent when a welding wire rod is produced by melting. Al has an effect of reducing the weld cracking susceptibility. Further, Al fixes N in a weld metal, thus contributing to improvement in the strength, as an N-stabilizing element. The weld metal is a metal of a welded portion in which a welding rod is molten and from which slag is removed. It is necessary to include the content of Al of 0.01 mass % or more in order for Al to exhibit these effects. However, when the content of Al is excessive, slag floats on the surface of a molten pool during TIG welding or MIG welding. This slag adheres firmly to the surface of the welded metal as a scale film, and an incomplete fusion or the like may be therefore caused. The welding performance may be thereby reduced. Accordingly, the upper limit of the content of Al is set to 0.7 mass %. When the content of Al is in the range of 0.26 mass % or more, the tensile strength and the weld cracking susceptibility of the welded portion and the welding performance may be clearly improved with a good balance. Accordingly, the lower limit of the content of Al may be set to 0.26 mass % (or the content of Al may be set to 0.26 to 0.7 mass %), in view of balance among the tensile strength and the weld cracking susceptibility of the welded portion and the welding performance. Preferably, the content of Al is low in order to obtain stable and excellent welding performance with no production of the scale film even under a high heat input such as during plasma TIG welding. However, preferably, the content of Al is set to 0.05 to 0.5 mass % in order to reduce the weld cracking susceptibility as well as to obtain the stable and excellent welding performance.

Ti (titanium) is used as a deoxidation agent, and has an effect of reducing the weld cracking susceptibility, like Al. Ti also contributes to improving hot workability during production of a filler material. Further, Ti has a strong affinity for N, and deposits as TiN. Due to this property, a fine structure of the welded portion may be obtained, thus contributing to improvement in the tensile strength. It is necessary to include the content of Ti of 0.01 mass or more in order for Ti to exert these effects. However, when the content of Ti is excessive, slag is produced during the welding, and the welding performance is thereby reduced, as in the case of Al. Thus, the content of Ti is set to 0.01 to 0.7 mass %. When the content of Ti is in the range of 0.36 mass % or more, the tensile strength and the weld cracking susceptibility of the welded portion and the welding performance may be clearly improved with a good balance. Accordingly, as in the case of Al, the lower limit of the content of Ti may be set to 0.36 mass % (or the content of Ti may be set to 0.36 to 0.7 mass %), in view of balance among the tensile strength and the weld cracking susceptibility of the welded portion and the welding performance. Preferably, the content of Ti is set to 0.05 to 0.5 mass % in order to improve the welding performance and to reduce the weld cracking susceptibility, as in the case of Al.

Cr (chromium) is an element essential for enhancing the corrosion resistance. It is necessary to include the content of Cr of 25.0 mass % or more in order for Cr to exert a satisfactory effect for the stress corrosion cracking resistance. However, when the content of Cr exceeds 31.5 mass %, the hot workability during production of the filler material is remarkably reduced or the ductility-dip cracking due to the grain boundary carbide deposition is promoted. Thus, the content of Cr is set to 25.0 to 31.5 mass %.

Ta (tantalum) is a congener of Nb. Ta generates a compound with carbon and nitrogen and increases the corrosion resistance, which is similar to Nb. However, Ta is different from Nb in that even if the content of Ta is increased, the number of cracks in the weld cracking does not increase during the build-up welding on the SUS 304 plate. Thus, even if Ta is the congener of Nb, the behavior of the weld cracking cannot be adjusted by the content of Nb+Ta. Addition of Ta increases the strength caused by the deposition strengthening and the solid solution strengthening. The effect of addition of Ta is manifested when the content of Ta is 1 mass % or more. However, when the content of Ta that exceeds 10 mass % is included, the tensile strength will excessively increase and ductility will decrease. Thus, the content of Ta is set to 1 to 10 mass %.

Mo (Molybdenum) is an element for effectively increasing the strength by the solid solution strengthening. The effect of Mo is manifested when the content of Mo is 1 mass % or more. However, when the content of Mo that exceeds 6 mass % is included, the tensile strength will excessively increase and the ductility will decrease. Thus, the content of Mo is set to 1 to 6 mass %.

P (phosphorus) is an inevitable impurity that produces eutectic with Ni (Ni—Ni$_3$P or the like) having a low melting point. When the content of P is large, the weld cracking susceptibility is increased. Thus, the smaller content of P is better. However, excessive limitation of P leads to lowered economical efficiency. Thus, the content of P is set to 0.02 mass % or less.

O (oxygen) is an inevitable impurity that comes from the atmosphere during production of the filler material by melting. O gathers at the grain boundary of the welded metal in the form of an oxide and then reduces high temperature strength of the grain boundary. Further, O increases the weld cracking susceptibility. Thus, the content of O is set to 0.01 mass % or less.

N (nitrogen) is an inevitable impurity, like O. It is therefore important to set the limit value for the content of N. N combines with Ti or the like to form a nitride (TiN or the like), and contributes to increasing the tensile strength. However, when the content of N exceeds 0.1 mass high temperature ductility decreases. Thus, the content of N is set to 0.1 mass % or less.

S (sulfur) is an inevitable impurity that that produces eutectic with Ni having a low melting point, like P. S is an element that is extremely low in solubility with respect to a Ni-based alloy, tends to segregate at the grain boundary, and promotes the weld cracking susceptibility most. Assume that a welded joint of a thick structural member having a high reaction stress is fabricated and then a bend test is conducted on the welded portion. A weld cracking transitionally expands when the content of S exceeds 0.0015 mass %. Thus, the content of S is set to 0.0015 mass % or less.

H (hydrogen) is an inevitable impurity to be mixed into the wire due to attachment of a lubricant when the wire is melted or drawn. H is trapped at a location with a high residual stress or by a carbide, which may cause occurrence of a microvoid due to hydrogen embrittlement. The integrity of the microstructure may be thereby reduced. Accordingly, the content of H is set to 0.0015 mass % or less.

Cu (copper) is an inevitable impurity whose dilution ratio is large when build-up welding is performed on a carbon steel plate. Cu increases the weld cracking susceptibility when a considerable amount of Fe is included in the welded metal. Cracking that may be generated due to an increase in the content of Cu is generated because, Fe, which has been mixed into the welded metal from the carbon steel during the build-up welding on the carbon steel plate, does not dissolve into Cu at all. This cracking is generated due to an increase in the content of S as described above. This cracking and a weld cracking at the welding joint of the thick structural member are different in terms of a welding work condition and a cause of generation. Cu is, however, included as an impurity element in the melting material. Thus, in view of this respect, the content of Cu is set to 0.08 mass % or less.

Co (cobalt) is an inevitable impurity having a long half life. When such Co is included for a pressurized water reactor, radioactivated Co circulates together with an oxide and the like in a nuclear reactor system when Ni-based alloy 690 is used, and then increases a radioactivity level when a periodic inspection or the like is made. Thus, it is better not to include Co in the welding wire. However, about 1 or 2% of Co is originally included in the Ni-based material. Thus, in view of this respect, the content of Co is set to 0.05 mass % or less.

When Ca (calcium) and Mg (magnesium) are further included as inevitable impurities, preferably, the total content of Ca and Mg is controlled to be less than 0.002 mass %. Each of Ca and Mg is an element having a strong affinity for O or S, exerts strong deoxidation and desulfurization effects, and may reduce the weld cracking susceptibility. Ca and Mg promote scale generation on a weld bead surface more notably than Al and Ti. Thus, Ca and Mg are treated as the inevitable impurities. Especially when the total content of Ca and Mg is 0.002 mass % or more, scale generation tends to notably occur. Accordingly, preferably the total content of Ca and Mg is controlled to be less than 0.002 mass % or less.

As described above, the chemical composition including Ta alone as the group V element is preferable in view of only the drawback of Nb of reducing the weld cracking resistance. However, Nb is the element that is effective for improving the corrosion resistance and the strength, like Ta. In addition, Nb is lower in cost than Ta. Then, a part of Ta may be substituted for by Nb, in view of these advantages. In this case, the content of Nb is set to 0.5 mass % or less, and the elements included in the welding wire are so adjusted that the contents of S, Ta, Nb, Al, Ti, Mo, and N satisfy the following relations (3) and (4):

$$12000S+0.58Ta+2.1Nb-2.6Al-2Ti \leq 19.3 \qquad (3)$$

$$Ta+3.8Nb+1.6Mo+187N \geq 5.7 \qquad (4).$$

The inventors have studied a condition of a high Cr Ni-based alloy welding wire for improving tensile strength and weld cracking resistance of a welded portion, the integrity of the microstructure of a welded metal, and a scaling inhibition effect, even when Nb is added. As a result, the inventors have found that a relationship between improvement in the weld cracking resistance and the contents of S, Ta, Nb, Al and Ti is established by the above relation (3) and a relationship between improvement in the tensile strength of the welded portion and the contents of Ta, Nb, Mo, and N is established by the above relation (4), in addition to the above-mentioned chemical composition of Nb and the like. By configuring the welding wire to have the above-mentioned chemical composition of Ta, Nb, and the like and to satisfy the above-mentioned relations (3) and (4), the high Cr Ni-based alloy welding wire that achieves excellent tensile strength and excellent weld cracking resistance of the welded portion, excellent integrity of the microstructure of the welded metal, and excellent welding performance may be provided. In addition, the manufacturing cost of the welding wire may be reduced. The calculated value of the above relation (3) is also set to be 19.3 or less, like that in the above relation (1). The smaller the calculated value of the above relation (3) is, the more the weld cracking resistance tends to increase. For that reason, the computed value of the above relation (3) may also be set to be 13 or less.

Preferably, the high Cr Ni-based alloy welding wire of the present invention further comprises, by mass, at least one kind of element selected from B (boron), Zr (zirconium), and rare earth elements (REM): 0.02% or less. B in a Ni-based alloy deposits along the grain boundary more preferentially than a sulfide that embrittles the grain boundary at high temperature. Thus, B has an effect of strengthening the grain boundary. B is especially effective for reducing ductility-dip cracking at high temperature. Preferably, B in the range of 0.001 to 0.005 mass % is added.

Zr has a strong affinity for O, and therefore has a function as a deoxidation agent. However, when an adding amount of Zr is large, Zr produces an eutectic compound with Ni having a low melting point. The weld cracking susceptibility is thereby increased.

As the rare earth elements, La (lanthanum), Ce (cerium), and the like are used. The rare earth element has large deoxidation and desulfurization effects, and has an effect of reducing a cracking that may be generated during hot processing due to strengthening of the grain boundary and an effect of reducing the weld cracking susceptibility. When the adding amount of the rare earth element is large, however, an eutectic compound with Ni having a low melting point is produced. The weld cracking susceptibility is thereby increased.

Each of B, Zr, and the rare earth elements has an effect of increasing the weld cracking resistance. However, the same effect may be obtained by combined addition of B, Zr, and the rare earth elements. Excessive addition of B, Zr, and the rare earth elements, however, increases the weld cracking susceptibility. Accordingly, the high Cr Ni-based alloy welding wire of the present invention comprises 0.02 mass % or less of at least one kind of element selected from B, Zr, and the rare earth elements.

When the high Cr Ni-based alloy welding wire of the present invention is based on ERNiCrFe-13 of AWS A5.14/A5.14M: 2009, the alloy composition of the high Cr Ni-based alloy welding wire should satisfy the composition requirements of the invention, and then may comprise by mass, C: 0.03% or less, Mn: 1.0% or less, Si: 0.50% or less, Fe: 1 to 12%, Al: 0.5% or less, Ti: 0.5% or less, Cr: 28 to 31.5%, Nb: 0.5% or less, Nb Ta: 2.1 to 4.0%, Mo: 3.0 to 5.0%, B: 0.003% or less, and Zr: 0.02% or less, and as inevitable impurities, Ca+Mg: less than 0.002%, Cu: 0.08% or less, Co: 0.05% or less, P: 0.02% or less, S: 0.0015% or less, O: 0.01% or less, N: 0.1% or less, H: 0.0015% or less, and the balance: Ni.

In this case, preferably, the content of Ni is set to 52.0 to 62.0 mass %.

A high Cr Ni-based alloy welding wire of the present invention may be used in the form of a shielded metal arc welding rod. In this case, the chemical composition of the shielded metal arc welding rod comprises, by mass, C: 0.04% or less, Mn: 7% or less, Fe: 1 to 12%, Si: 0.75% or less, Al: 0.26 to 1.0%, Ti: 0.36 to 1.0%, Cr: 25.0 to 31.5%, Nb: 3.0% or less, Ta: 3.0% or less, and Mo: 1 to 6%, and as inevitable impurities, N: 0.1% or less, and, P: 0.02% or less, S: 0.0015% or less, O: 0.01% or less, H: 0.0015% or less, Cu: 0.08% or less, and Co: 0.05% or less, and the balance: Ni.

An effect expected for each element included in the shielded metal arc welding rod of the present invention and the reason for limiting the content of each element are almost the same as those in the case of the above-mentioned high Cr Ni-based alloy welding wire. The reason for limiting the content of Al in the shielded metal arc welding rod of the present invention to 0.26 to 1.0 mass % is to ensure improvement in tensile strength and weld cracking susceptibility of a welded portion, and ensure improvement in welding performance. The reason for limiting the content of Ti to 0.36 to 1.0 mass % is to ensure improvement in the tensile strength and the weld cracking susceptibility of the welded portion and ensure improvement in the welding performance. That is, no scale is generated on the weld bead surface of the shielded metal arc welding rod, unlike in the case of TIG welding or the like. Thus, the lower limits of the contents of Al and Ti of the welding wire may be respectively increased to 0.26 mass % and 0.36 mass %. With this arrangement, deoxidation and desulfurization effects may be increased during welding, the weld cracking susceptibility may be reduced, and the tensile strength may be improved. When the contents of Al and Ti each exceed 1.0 mass %, however, slag detachability is reduced and the welding performance is therefore reduced. Thus, the upper limits of the contents of Al and Ti are each set to 1.0 mass %.

The reason for limiting the content of Nb to 3.0 mass % or less is to maintain excellent welding performance and excellent weld cracking resistance, and to improve tensile strength while reducing manufacturing cost as described above, even if a part of Ta is substituted for by Nb. On the other hand, when Nb is added from the welding wire (core wire for the shielded metal arc welding rod) and when the content of Nb exceeds 3.0 mass %, slag burns and the welding performance is thereby reduced. Thus, the upper limit of the content of Nb is set to 3.0 mass %.

The reason for limiting the content of Ta to 3.0 mass % or less is to improve the tensile strength of the welded portion while maintaining the excellent welding performance and the excellent weld cracking resistance by including Ta. On the other hand, when Ta is added from the welding wire (core wire for the shielded metal arc welding rod) and when the content of Ta exceeds 3.0 mass %, slag burns and the welding performance is therefore reduced. Thus, the upper limit of the content of Ta is set to 3.0 mass %. When the high Cr Ni-based alloy welding wire of the present invention is used for the shielded metal arc welding rod as described above, the tensile strength and the weld cracking resistance of the welded portion, the integrity of the microstructure of a welded metal, and the welding performance may be increased.

When the high Cr Ni-based alloy welding wire of the present invention is used for the shielded metal arc welding rod, a weld metal after the welding comprises the following alloy composition. That is, there may be obtained the weld metal formed by the shielded metal arc welding comprising, by mass, C: 0.04% or less, Mn: 7% or less, Fe: 1 to 12%, Si: 0.75% or less, Al: 0.01 to 0.7%, Ti: 0.01 to 0.7%, Cr: 25.0 to 31.5%, Nb Ta: 1.8 to 4.5%, Mo: 1 to 6%, and as inevitable impurities, the total content of Ca and Mg: less than 0.002%, N: 0.1% or less, P: 0.02% or less, S: 0.005% or less, O: 0.1% or less, H: 0.002% or less, Cu: 0.08% or less, and Co: 0.05% or less, and the balance: Ni.

An effect of each element included in the weld metal formed by the shielded metal arc welding according to the present invention and the reason for limiting the content of each element are almost the same as those in the case of the above-mentioned high Cr Ni-based alloy welding wire. The reason for limiting the content of S to 0.005 mass % or less in the weld metal formed by shielded metal arc welding rod according to the present invention is that a trace of S is included in a flux covering the welding rod, thereby increasing the content of S in the weld metal. However, according to the Boiler and Pressure Vessel Code of the ASME, the content of Mn in a shielded metal arc welding rod may be increased to fix S as MnS with a high melting point, and an adverse effect on a weld cracking due to grain boundary segregation of S may be thereby reduced. No scale attaches to the weld bead surface of the shielded metal arc welding rod, unlike in case of the TIC welding or the like. Thus, the contents of Al and Ti in the wire may be increased. With that arrangement, deoxidation and desulfurization effects may be increased and weld cracking susceptibility may be thereby reduced during welding. In view of these respects, the content of S in the weld metal formed by the shielded arc welding rod of the present invention is relaxed more than the limiting value for the welding wire.

The weld cracking susceptibility may be reduced for the reason described above. Thus, the content of Nb may be increased more than in the case of the welding wire. Nb is the element that is effective for improving the corrosion resistance and the strength, like Ta, and is lower in cost than Ta, as described above. Thus, by replacing apart of Ta with Nb, manufacturing cost may also be reduced. Then, in the weld metal formed by the shielded metal arc welding rod of the present invention, the content of Nb+Ta in the welded metal is set to 1.8 to 4.5 mass %. When the content of Nb+Ta exceeds 4.5 mass %, weld cracking resistance may be reduced, or slag may burn on the weld bead surface, thereby reducing welding performance. Nb and Ta may be added from the flux as alloy elements. In addition, when added from the welding wire to be used for the shielded metal arc welding rod, Nb and Ta may be more stably transferred to the welded metal.

During shielded metal arc welding, an oxide-based slag obtained by melting of a flux remains in a weld metal as a non-metal inclusion. Thus, the weld metal includes a larger content of O that formed by the TIG welding. Then, the content of O as the inevitable impurity in the weld metal formed by the shielded metal arc welding according to the present invention is set to 0.1 mass %. Preferably, the content of H is set to 0.002 mass % or less. The reason for limiting this content of H is that moisture absorbed by the flux newly generates hydrogen, and the content of H is therefore relaxed from the limiting value for H in the case of the welding wire, in view of this respect.

When the welding elements are added from the welding wire, the welding wire having the content of Nb of 3.0 mass % or less may be used. However, when the content of Nb in the wire exceeds 3.0 mass %, slag burns on the weld bead surface. Then, the upper limit of the content of Nb is set to 3.0 mass %. Further, when each of the contents of Al and Ti in the welding wire exceeds 1.0 mass %, slug detachability is reduced, and the welding performance is therefore reduced. Thus, the upper limits of the contents of Al and Ti are each set to 1.0 mass %.

Preferably, the content of at least one kind of element selected from B, Zr, and rare earth elements in the shielded metal arc welding rod and the weld metal formed by the shielded metal arc welding according to the present invention is set to 0.02% or less. The effect and the reason for limiting the content of each element are the same as those in the case of the high Cr Ni-based alloy welding wire described above.

BRIEF DESCRIPTION OF THE DRAWINGS

FIG. 3B is a graph showing a relationship between the content of Ta and the result of the dye penetrant test.

MODE FOR CARRYING OUT THE INVENTION

Figure 1A:
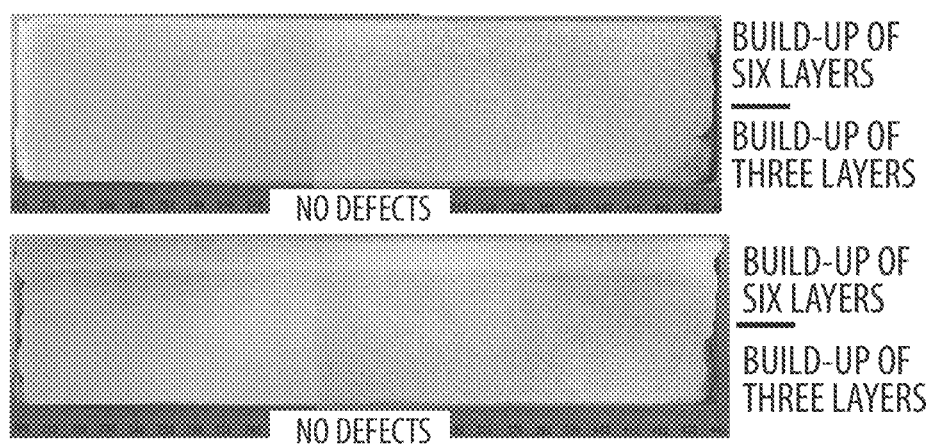
FIG. 1A includes photographs each showing a result of a dye penetrant test conducted on a build-up welded portion formed on a SUS 304 plate by TIG welding using an embodiment (Example 2) of the present invention.

An embodiment of a high Cr Ni-based alloy welding wire of the present invention will be described below. Table 2 shows alloy compositions of high Cr Ni-based alloy welding wires in the embodiment of the present invention and alloy compositions of Comparative Examples for confirming an effect of the present invention.

TABLE 2

| | | | | | | | | | | | | | | |
|---|---|---|---|---|---|---|---|---|---|---|---|---|---|---|
| Chemical Compositions of Welding Wires (Mass %) | | | | | | | | | | | | | | |
| | Wire Symbol | C (%) | Mn (%) | Fe (%) | P (ppm) | S (ppm) | Si (%) | Cu (%) | Ni (%) | Al (%) | Ti (%) | Cr (%) | Nb (%) | Ta (%) |
| Example 1 | Y1 | 0.023 | 1.26 | 10.2 | 60 | 6 | 0.25 | 0.03 | Rem. | 0.12 | 0.25 | 27.8 | — | 1.1 |
| Example 2 | Y2 | 0.022 | 0.45 | 8.5 | 20 | 7 | 0.71 | 0.005 | Rem. | 0.15 | 0.25 | 25.5 | 0.15 | 2.2 |
| Example 3 | Y3 | 0.021 | 3.28 | 9.2 | 10 | 5 | 0.86 | 0.003 | Rem. | 0.31 | 0.36 | 28.9 | 0.23 | 1.2 |
| Example 4 | Y4 | 0.02 | 0.15 | 9.5 | 100 | 5 | 0.26 | 0.05 | Rem. | 0.32 | 0.36 | 29.6 | — | 1.05 |
| Example 5 | Y5 | 0.016 | 0.09 | 7.1 | 50 | 6 | 0.21 | 0.04 | Rem. | 0.17 | 0.22 | 30.0 | — | 2.5 |
| Example 6 | Y6 | 0.016 | 0.35 | 6.56 | 110 | 4 | 0.32 | 0.02 | Rem. | 0.32 | 0.41 | 29.5 | 0.01 | 2.3 |
| Example 7 | Y7 | 0.031 | 6.68 | 3.5 | 50 | 6 | 0.51 | 0.06 | Rem. | 0.21 | 0.32 | 30.1 | — | 5.8 |
| Example 8 | Y8 | 0.025 | 0.69 | 3.2 | 20 | 8 | 0.46 | 0.01 | Rem. | 0.29 | 0.20 | 25.2 | — | 6.2 |
| Example 9 | Y9 | 0.015 | 2.51 | 1.2 | 60 | 4 | 0.21 | 0.005 | Rem. | 0.16 | 0.42 | 26.2 | — | 9.2 |
| Example 10 | Y10 | 0.021 | 0.45 | 8.4 | 30 | 8 | 0.15 | 0.02 | Rem. | 0.26 | 0.37 | 29.5 | 0.41 | 2.2 |
| Example 11 | Y11 | 0.032 | 0.38 | 8.4 | 40 | 4 | 0.26 | 0.01 | Rem. | 0.28 | 0.40 | 29.8 | 0.32 | 3.0 |
| Example 12 | Y12 | 0.015 | 0.74 | 9.2 | 20 | 5 | 0.25 | 0.02 | Rem. | 0.09 | 0.12 | 29.2 | — | 1.3 |
| Example 13 | Y13 | 0.022 | 0.9 | 9.8 | 50 | 10 | 0.26 | 0.03 | Rem. | 0.41 | 0.49 | 30.2 | 0.09 | 1.15 |
| Example 14 | Y14 | 0.029 | 1.1 | 6.5 | 60 | 10 | 0.32 | 0.02 | Rem. | 0.56 | 0.64 | 30.6 | 0.07 | 2.8 |
| Example 15 | Y15 | 0.016 | 1.2 | 7.4 | 80 | 12 | 0.28 | 0.01 | Rem. | 0.68 | 0.65 | 29.1 | 0.01 | 2.2 |
| Example 16 | Y16 | 0.035 | 0.75 | 2.4 | 40 | 7 | 0.52 | 0.07 | Rem. | 0.16 | 0.23 | 31.2 | — | 5.7 |
| Comparative Example 1 | Y17 | 0.009 | 0.03 | 9.32 | 30 | 10 | 0.11 | 0.12 | Rem. | 0.32 | 0.41 | 30.6 | — | — |
| Comparative | Y18 | 0.01 | 0.36 | 0.01 | 80 | 8 | 0.07 | 0.01 | Rem. | 0.22 | 0.31 | 28.71 | 0.10 | 10.5 |

TABLE 2-continued

| Chemical Compositions of Welding Wires (Mass %) | | | | | | | | | | | | | | |
|---|---|---|---|---|---|---|---|---|---|---|---|---|---|---|
| Example 2 Comparative Example 3 | Y19 | 0.021 | 0.45 | 9.9 | 100 | 15 | 0.36 | 0.05 | Rem. | 0.15 | 0.25 | 29.3 | 0.83 | 0.01 |
| Comparative Example 4 | Y20 | 0.03 | 0.36 | 11.5 | 80 | 6 | 0.25 | 0.03 | Rem. | 0.007 | 0.008 | 30.1 | 0.03 | 1.2 |
| Comparative Example 5 | Y21 | 0.025 | 0.48 | 6.3 | 50 | 5 | 0.42 | 0.04 | Rem. | 0.71 | 0.73 | 29.3 | — | 3.3 |
| Comparative Example 6 | Y22 | 0.023 | 0.9 | 6.22 | 40 | 20 | 0.09 | 0.06 | Rem. | 0.11 | 0.24 | 30.06 | 0.10 | 2.3 |
| Comparative Example 7 | Y23 | 0.011 | 0.26 | 8.2 | 80 | 17 | 0.12 | 0.01 | Rem. | 0.63 | 0.51 | 28.9 | 0.03 | 3.7 |
| Comparative Example 8 | Y24 | 0.026 | 0.24 | 11 | 30 | 20 | 0.18 | 0.06 | Rem. | 0.70 | 0.52 | 28.96 | — | 0.01 |
| Comparative Example 9 | Y25 | 0.006 | 0.81 | 11.8 | 100 | 10 | 0.03 | 0.08 | Rem. | 0.078 | 0.18 | 29.33 | — | 0.97 |
| Comparative Example 10 | Y26 | 0.007 | 0.81 | 10.5 | 50 | 10 | 0.02 | 0.09 | Rem. | 0.081 | 0.18 | 28.93 | — | 1.2 |
| Comparative Example 11 | Y27 | 0.02 | 0.26 | 10 | 50 | 5 | 0.26 | 0.04 | Rem. | 0.07 | 0.21 | 23.8 | — | 0.78 |
| Comparative Example 12 | Y28 | 0.02 | 0.31 | 8.79 | 40 | 5 | 0.11 | 0.05 | Rem. | 0.13 | 0.18 | 29.5 | 2.51 | 0.01 |

| | Mo | Co | O | N | H | Ca + Mg | B | Zr | REM | Relations | | | |
|---|---|---|---|---|---|---|---|---|---|---|---|---|---|
| | (%) | (%) | (ppm) | (%) | (ppm) | (ppm) | (ppm) | (ppm) | (ppm) | (1) | (3) | (2) | (4) |
| Example 1 | 1.2 | 0.03 | 45 | 0.016 | 8 | — | — | — | — | 7.0 | — | 6.0 | — |
| Example 2 | 3.2 | 0.01 | 30 | 0.02 | 7 | 17 | — | — | — | — | 9.1 | — | 11.6 |
| Example 3 | 1.3 | 0.04 | 15 | 0.021 | 7 | — | 10 | — | — | — | 5.7 | — | 8.1 |
| Example 4 | 1.5 | 0.02 | 20 | 0.02 | 9 | 10 | 20 | 15 | 30 | 5.1 | — | 7.2 | — |
| Example 5 | 5.0 | 0.04 | 30 | 0.015 | 9 | — | 10 | — | 50 | 7.8 | — | 13.3 | — |
| Example 6 | 4.2 | 0.03 | 50 | 0.005 | 13 | — | 10 | 50 | 60 | 4.5 | — | 10.0 | — |
| Example 7 | 3.2 | 0.01 | 20 | 0.015 | 12 | — | 60 | — | — | 9.4 | — | 13.7 | — |
| Example 8 | 2.5 | 0.02 | 30 | 0.012 | 11 | — | — | — | — | 12.0 | — | 12.4 | — |
| Example 9 | 1.6 | 0.03 | 25 | 0.028 | 8 | 10 | — | — | — | 8.9 | — | 17.0 | — |
| Example 10 | 2.1 | 0.01 | 90 | 0.016 | 10 | 19 | — | — | — | — | 7.9 | — | 10.5 |
| Example 11 | 3.2 | 0.02 | 70 | 0.026 | 7 | 17 | — | — | — | — | 5.7 | — | 14.2 |
| Example 12 | 1.5 | 0.005 | 40 | 0.03 | 5 | 18 | — | — | — | 6.3 | — | 9.3 | — |
| Example 13 | 2.4 | 0.03 | 20 | 0.025 | 7 | — | — | — | — | — | 10.8 | — | 10.0 |
| Example 14 | 3.4 | 0.005 | 25 | 0.008 | 11 | — | — | — | — | — | 11.0 | — | 10.0 |
| Example 15 | 3.4 | 0.03 | 15 | 0.033 | 7 | — | — | — | — | 12.6 | — | 13.8 | — |
| Example 16 | 4.5 | 0.04 | 15 | 0.025 | 7 | — | — | — | — | 10.6 | — | 17.6 | — |
| Comparative Example 1 | — | 0.05 | 10 | 0.023 | 10 | 10 | — | — | — | 10.3 | — | 4.3 | — |
| Comparative Example 2 | 10.5 | 0.03 | 69 | 0.009 | 8 | — | — | — | — | — | 14.7 | — | 29.4 |
| Comparative Example 3 | 0.02 | 0.03 | 50 | 0.01 | 10 | — | — | — | — | — | 18.9 | — | 5.1 |
| Comparative Example 4 | 1.3 | 0.01 | 60 | 0.03 | 9 | — | — | — | — | — | 7.9 | — | 9.0 |
| Comparative Example 5 | 3.1 | 0.02 | 40 | 0.03 | 7 | — | — | — | — | 4.6 | — | 13.9 | — |
| Comparative Example 6 | 3.1 | 0.06 | 31 | 0.01 | 10 | 11 | — | — | — | — | 24.8 | — | 9.5 |
| Comparative Example 7 | 3.4 | 0.01 | 20 | 0.009 | 10 | 15 | — | — | — | — | 20.0 | — | 10.9 |
| Comparative Example 8 | 0.01 | 0.03 | 55 | 0.008 | 25 | 16 | — | — | — | 21.1 | — | 1.5 | — |
| Comparative Example 9 | 0.02 | 0.02 | 30 | 0.007 | 10 | 30 | 10 | — | — | 12.0 | — | 2.3 | — |
| Comparative Example 10 | 0.02 | 0.04 | 45 | 0.02 | 25 | 25 | 20 | 20 | 10 | 12.1 | — | 5.0 | — |
| Comparative Example 11 | 0.02 | 0.02 | 22 | 0.011 | 7 | — | — | — | — | 5.9 | — | 2.9 | — |
| Comparative Example 12 | 3.51 | 0.01 | 28 | 0.006 | 7 | 90 | — | 20 | — | — | 10.6 | — | 16.3 |

Relations:
(1) 1200OS + 0.58Ta − 2.6Al − 2Ti ≤ 19.3
(2) Ta + 1.6Mo + 187N ≥ 5.7
(3) 1200OS + 0.58Ta + 2.1Nb − 2.6Al − 2Ti ≤ 19.3
(4) Ta + 3.8Nb + 1.6Mo + 187N ≥ 5.7

Examples 1 to 16 in Table 2 show the alloy compositions of the welding wires in this embodiment. The welding wire in each of Example 1 to 16 comprises, by mass, C: 0.04% or less, Mn: 7% or less, Fe: 1 to 12%, Si: 0.75% or less, Al: 0.01 to 0.7%, Ti: 0.01 to 0.7%, Cr: 25.0 to 31.5%, Ta: 1 to 10%, and Mo: 1 to 6%, and as inevitable impurities, P: 0.02% or less, O: 0.01% or less, N: 0.1% or less, S: 0.0015% or less, H: 0.0015% or less, Cu: 0.08% or less, and Co: 0.05% or less, and the balance: Ni. The contents of S, Ta, Al, Ti, Mo, and N in each of Examples 1, 5, 6, 7, 8, 9, 12, 15, and 16 satisfy the following relations (1) and (2):

$$12000S + 0.58Ta - 2.6Al - 2Ti \leq 19.3 \quad (1)$$

$$Ta + 1.6Mo + 187N \geq 5.7 \quad (2).$$

Further, the content of Nb in each of Examples 2, 3, 4, 10, 11, 13, and 14 satisfies a condition of 0.5 mass % or less, and the contents of S, Ta, Nb, Al, Ti, Mo, and N in each of Examples 2, 3, 4, 10, 11, 13, and 14 satisfy the following relations (3) and (4).

$$12000S + 0.58Ta + 2.1Nb - 2.6Al - 2Ti \leq 19.3 \quad (3)$$

$$Ta + 3.8Nb + 1.6Mo + 187N \geq 5.7 \quad (4).$$

Further, the content of Al in each of Examples 3, 4, 6, 8, 10, 11, 13, 14, and 15 satisfies a condition of 0.26 to 0.7 mass %. The content of Ti in each of Examples 3, 4, 6, 9, 10, 11, 13, 14, and 15 satisfies a condition of 0.36 to 0.7 mass %.

The content of Nb in each of Examples 2, 4, 9, 10, 11, and 12 satisfies the condition of 0.5 mass % or less, and the total content of Ca and Mg as an inevitable impurity satisfies a condition of less than 0.002 mass %.

The content of at least one kind of element selected from B, Zr, and rare earth elements in each of Examples 3 to 7 further satisfies a condition of 0.02 mass % or less.

Table 3 shows evaluation results obtained by conducting a tensile test on a weld metal, a dye penetrant test on a build-up welded portion, a side bend test on a welded metal portion of a thick structural member, a check test of a microstructure (presence or absence of a microvoid in the structure of a welded metal) in the section of the welded metal, and a test for checking presence or absence of scale generation on the build-up surface (weld bead surface) of multiple layers on a carbon steel plate resulting from build-up welding. The weld metal is formed by using each of the high Cr Ni-based alloy welding wires of the various alloy compositions shown in Table 2.

TABLE 3

| | Evaluation of Welding Wire Characteristics | | | | | | |
|---|---|---|---|---|---|---|---|
| | Tensile Strength (MPa) Test Temperature (° C.) | | Result of Penetration Test on Build-Up Portion | Result of Side Bend Test on Welded Portion of Thick Structural Member | | | Presence of Absence of Microvoid in Welded Metal Structure | Presence or Absence of Scale Generation on Welded Metal Structure |
| | Room Temp. | 350 | | Total Cracking Length (mm) | No. of Defects | Pass/Fail* | | |
| Example 1 | 634 | 501 | No Indication of Defect | 1.2 | 3 | Pass | None | None |
| Example 2 | 712 | 551 | No Indication of Defect | 3.3 | 5 | Pass | None | None |
| Example 3 | 702 | 505 | No Indication of Defect | 0.5 | 1 | Pass | None | None |
| Example 4 | 645 | 515 | No Indication of Defect | 0 | 0 | Pass | None | None |
| Example 5 | 720 | 558 | No Indication of Defect | 0 | 0 | Pass | None | None |
| Example 6 | 719 | 555 | No indication of Defect | 0 | 0 | Pass | None | None |
| Example 7 | 734 | 564 | No indication of Defect | 1.8 | 2 | Pass | None | None |
| Example 8 | 752 | 575 | No Indication of Defect | 3.1 | 7 | Pass | None | None |
| Example 9 | 760 | 578 | No Indication of Defect | 4.4 | 7 | Pass | None | None |
| Example 10 | 707 | 552 | No Indication of Defect | 4.0 | 5 | Pass | None | None |
| Example 11 | 724 | 557 | No Indication of Defect | 1.4 | 3 | Pass | None | None |
| Example 12 | 660 | 525 | No Indication of Defect | 0 | 0 | Pass | None | None |
| Example 13 | 677 | 524 | No Indication of Defect | 4.4 | 7 | Pass | None | None |
| Example 14 | 720 | 556 | No indication of Defect | 4.0 | 6 | Pass | None | None |
| Example 15 | 705 | 553 | No indication of Defect | 5.5 | 8 | Pass | None | None |
| Example 16 | 751 | 572 | No Indication of Defect | 4.6 | 6 | Pass | None | None |
| Comparative Example 1 | 570 | 460 | Indication of Defect | 7.7 | 11 | Fail | None | None |
| Comparative Example 2 | 810 | 576 | No Indication of Defect | 12.5 | 14 | Fail | None | None |
| Comparative Example 3 | 572 | 460 | Indication of Defect | 13.0 | 13 | Fail | None | None |

TABLE 3-continued

Evaluation of Welding Wire Characteristics

|  | Tensile Strength (MPa) Test Temperature (° C.) | | Result of Penetration Test on Build-Up Portion | Result of Side Bend Test on Welded Portion of Thick Structural Member | | | Presence of Absence of Microvoid in Welded Metal Structure | Presence or Absence of Scale Generation on Welded Metal Structure |
|---|---|---|---|---|---|---|---|---|
|  | Room Temp. | 350 |  | Total Cracking Length (mm) | No. of Defects | Pass/Fail* |  |  |
| Comparative Example 4 | 660 | 510 | No Indication of Defect | 7.5 | 11 | Fail | None | None |
| Comparative Example 5 | 722 | 562 | No indication of Defect | 0 | 0 | Pass | None | Present |
| Comparative Example 6 | 705 | 553 | Indication of Defect | 22.1 | 25 | Fail | None | None |
| Comparative Example 7 | 725 | 562 | Indication of Defect | 17.5 | 20 | Fail | None | None |
| Comparative Example 8 | 571 | 444 | Indication of Defect | 23.1 | 16 | Fail | Present | None |
| Comparative Example 9 | 620 | 470 | No Indication of Defect | 4.9 | 6 | Pass | None | Present |
| Comparative Example 10 | 623 | 482 | Indication of Defect | 6.5 | 9 | Pass | Present | Present |
| Comparative Example 11 | 580 | 446 | No Indication of Defect | 0.5 | 1 | Pass | None | None |
| Comparative Example 12 | 727 | 575 | Indication of Defect | 5.2 | 9 | Pass | None | Present |

*Notes (Ministerial Ordinance No. 81): (1) A crack should not exceed 3 mm in length (except those occurring at edge corners of a test (2) The total length of cracks having a length of 3 mm or less should not exceed 7 mm. (3) The number of cracks and/or blowholes should not exceed 10.

In the tensile test, tensile strengths of the weld metal at room temperature and at 350° C. were measured, based on JIS G 0202. When the tensile strength measured at the room temperature is included in a range of 610 to 780 MPa and the tensile strength measured at 350° C. is included in a range of 485 MPa or more, the measured tensile strength resulting from the tensile test was evaluated to be good. The reason why the appropriate ranges of the tensile strength are set to such numerical value ranges is as follows. When the tensile strength is less than 610 MPa at the room temperature or less than 485 MPa at 350° C., a satisfactory strength characteristic of the weld metal cannot obtained. When the tensile strength exceeds 780 MPa at the room temperature, reduction of ductility or an excessive increase in the residual stress of the welded portion may be caused.

Figure 1B:
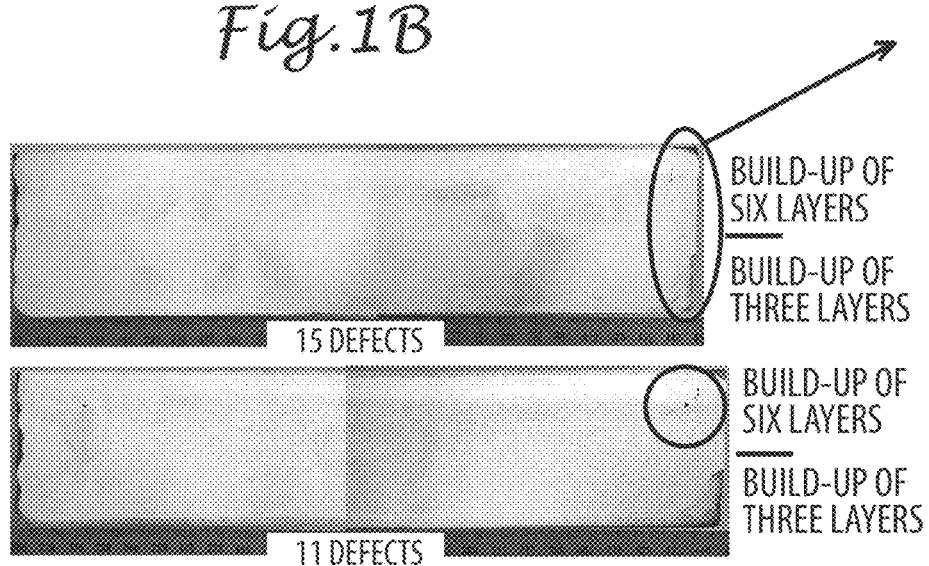
FIG. 1B includes photographs each showing a result of the dye penetrant test conducted in a similar manner using a comparative example (Comparative Example 12) of the present invention.
Figure 1C:
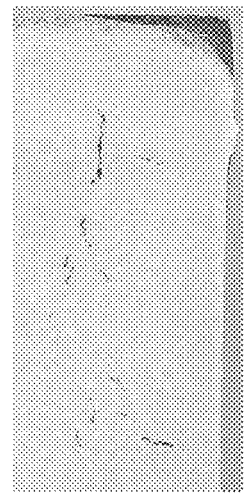
FIG. 1C is a photograph enlarging a portion of FIG. 1B (portion indicated by an arrow).
Figure 1D:
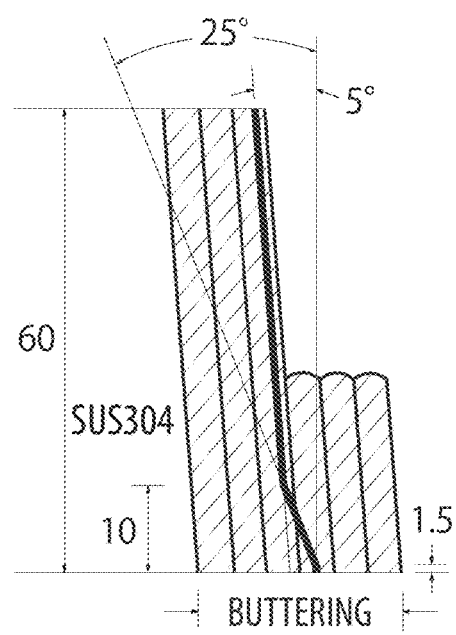
FIG. 1D is a sectional view showing the groove surface of the SUS 304 plate used in FIGS. 1A and 1B.

Evaluation of high-temperature cracking susceptibility using the dye penetrant test was conducted at the build-up welded portion of the groove surface of a SUS 304 thick-walled plate, as a preparatory step for production of a welded joint of a thick structure member for a restraint weld cracking test shown in FIGS. 2A and 2B that will be described later. In the dye penetrant test, build-up welding of three to six layers was performed on the groove surface with a groove width of approximately 60 mm and a groove length of approximately 250 mm by TIG welding (see FIGS. 1A to 1D). Then, a process surface obtained by deleting an excess metal portion was formed by machining to achieve a pre-determined groove shape. The dye penetrant test was conducted on this process surface, based on JIS Z 2343-1, and then presence or absence of a weld cracking was visually checked (see FIGS. 1A to 1C).

The side bend test was conducted, based on JIS Z 3122. A bend test piece of a shape with a plate thickness of 10 mm was taken from the welded joint of the thick structure member, and a guided bend test method using jigs of a male type and a female type was carried out on the bent test piece. The male type jig was pressed against the female type jig so that the test piece is bent to form a U-character shape. The curvature radius (R) of the surface of the test piece in that case was set to twice the plate thickness, or R was set to be equal to 20 mm. After the test, the bent surface was observed by a magnifying glass, and the number of cracks (or blowholes) produced at the welded portion and the length of the cracks were measured. Based on the ministerial ordinance (No. 81) defining technical standards for welding of an electrical work piece, evaluation of the side bend test was made according to the following requirements (1), (2), and (3):

(1) The length of a crack (except the one that occurs at an edge corner of the bend test piece) should not exceed 3 mm.
(2) The total length of cracks that satisfy the above requirement (1) should not exceed 7 mm.
(3) The number of cracks and/or blowholes should not exceed 10 pieces.

The bend test piece that has satisfied all of the above requirements (1) (2) and (3) was evaluated to have passed the side bend test. The bend test piece that does not satisfy one of the above requirements (1) to (3) was evaluated not to have passed the side bend test.

Figure 2A:
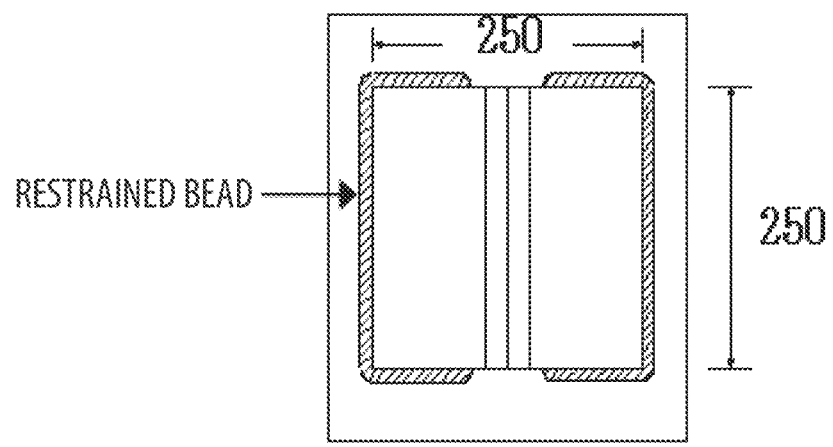
FIG. 2A is a plan view of a welded joint for a restraint weld cracking test of a thick plate (thick structural member) for evaluating weld cracking resistance.
Figure 2B:
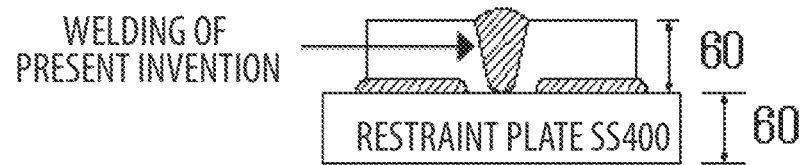
FIG. 2B is a front view of FIG. 2A.

In the check test of the microstructure, the section of the welded metal of the thick structural member (SS 400) shown in FIGS. 2A and 2B was magnified to about 15 to 400 times its original size, using an optical microscope to check presence or absence of a microvoid. As a test piece of observation by the optical microscope, the test piece obtained by the following process was used. The welded metal cut out from the thick structural member was embedded in a resin, and a baffed finish was applied to the embedded welded metal. Electrolytic etching is then applied to this resulting metal using 10 percent oxalic acid as an etching solution, thereby yielding the microstructure. The test piece in which the microstructure has been yielded by the above-mentioned process was used. The structure photograph that has been taken is shown in FIG. 5 which will be described later in detail.

In the test of welding performance, presence or absence of scale generation on the bead surface of the welded metal on the thick structural member (SS400) shown in FIGS. 2A and 2B was visually checked.

The effect of this embodiment will be specifically described, based on each test result shown in Table 3. In each of Comparative Examples 1, 3, 8, 9, and 11, the content of Ta is less than 1 mass % that is the lower limit, and in Comparative Example 10 the content of Mo is also less than 1 mass % that is the lower limit. Thus, the tensile strength of each of Comparative Examples 1, 3, 8, 9, 10 and 11 at 350° C. was less than 485 MPa. In Comparative Example 2, the content of Ta exceeds 10 mass %, and the content of Mo exceeds 6 mass % that is the upper limit. Thus, the tensile strength of Comparative Example 2 at the room temperature exceeded 800 Mpa. On contrast therewith, the contents of Ta and Mo in each of Examples 1 to 16 meet composition requirements of the present invention. Thus, a good characteristic of tensile strength that exceeded 610 MPa at the room temperature and exceeded 485 Mpa at 350° C. was obtained. Specifically, a good tensile strength was obtained in the range of the content of Ta: 1 to 10 mass % and in the range of the content of Mo: 1 to 6 mass %, as shown in Tables 2 and 3.

Figure 3A:
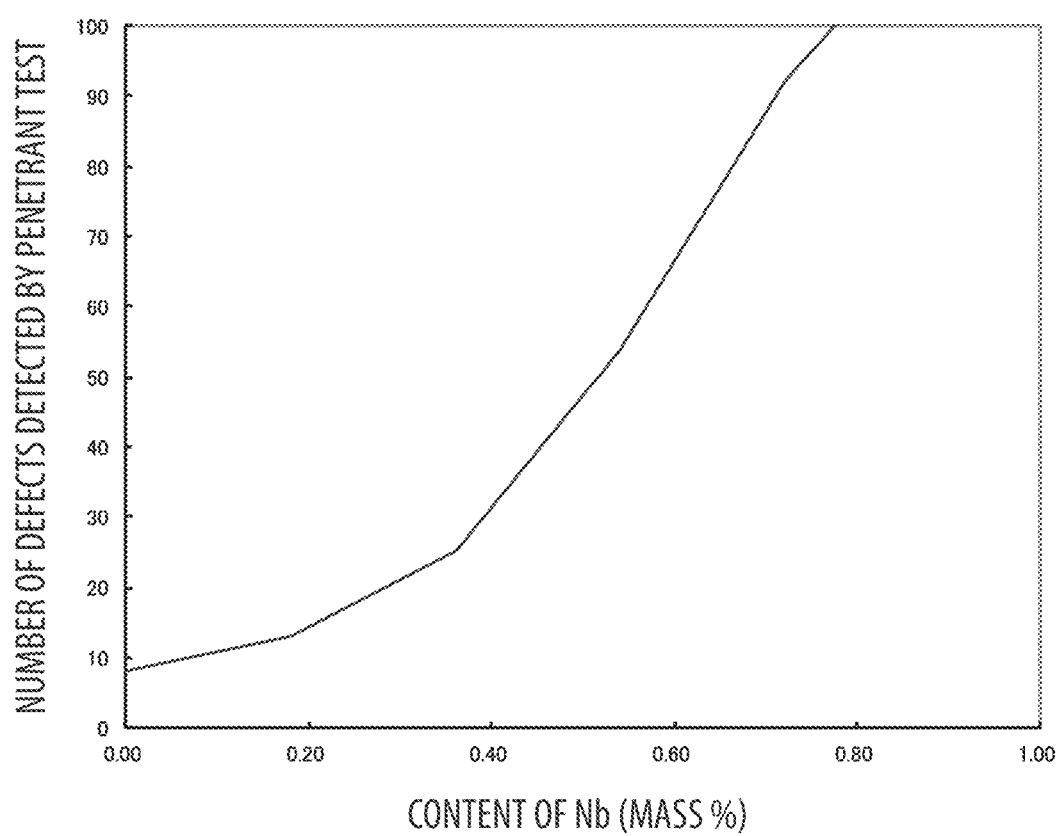
FIG. 3A is a graph showing a relationship between the content of Nb and a result of the dye penetrant test of a build-up welded portion on the SUS 304 plate formed by the TIG welding.

FIG. 3 graphically shows dye penetrant test results of many welding materials of Ni-based alloy 690 including Examples of the present invention and Comparative Examples, by sensitivity analysis using a neural network. FIG. 3A shows a relationship between Nb and the number of cracks, while FIG. 3B shows a relationship between Ta and the number of cracks. The number of cracks indicates the number of defects detected by the dye penetrant test. Referring to FIGS. 3A and 3B, the number of cracks on the build-up surface increases with an increase in the content of Nb, as shown in FIG. 3A. On contrast therewith, even if the content of Ta is increased, the number of cracks does not increase, as shown in FIG. 3B. This tendency shown in FIGS. 3A and 3B agrees with the fact that, although a defect has occurred in Comparative Example 3 (having the condition that the content of Nb exceeds 0.5 mass % and the content of Ta is less than 1 mass %), no defect has occurred in each of Examples 1 to 16 (having the condition that the content of Nb is 0.5 mass % or less and the content of Ta is 1 to 10 mass %).

The content of S in each of Comparative Examples 6 to 8 exceeds 0.0015 mass % (15 ppm) that is the upper limit. In each of Comparative Examples 6 to 8, consequently, the number of cracks exceeds 10 pieces, and the total length of the cracks in each of Comparative Examples 6 to 8 exceeds 7 mm in the side bend test. Thus, Comparative Examples 6 to 8 do not satisfy the technical standards for welding (defined in the ministerial ordinance No. 81). On contrast therewith, under the condition of the content of S: 0.0015 mass % or less as shown in Examples 1 to 16, good weld cracking resistance was obtained.

Figure 4:
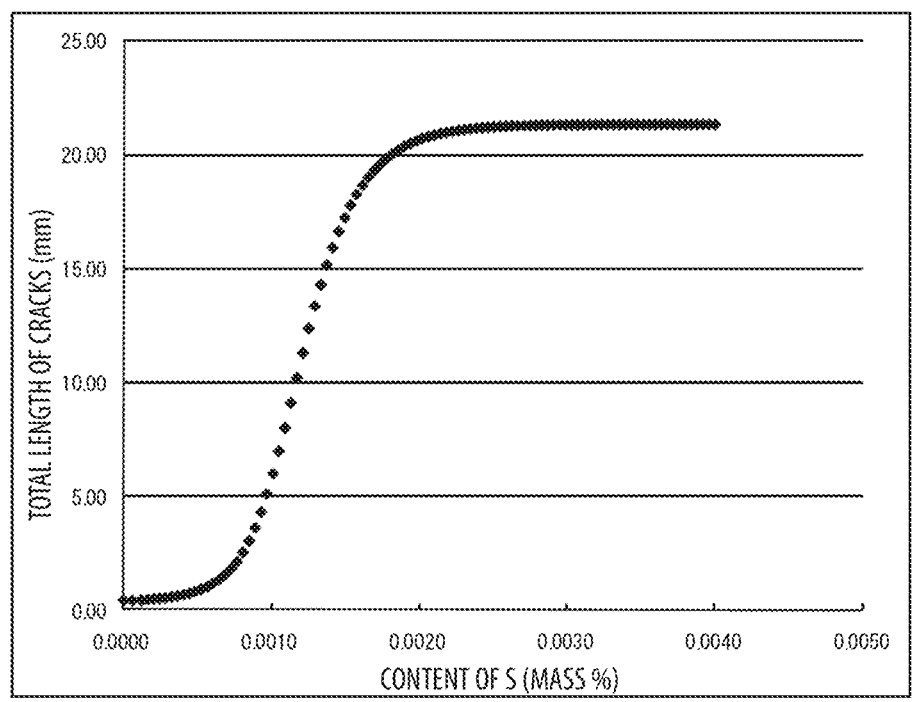
FIG. 4 is a graph showing a relationship between the content of S in a welding wire and a result of a side bend test conducted on a portion of the thick plate (thick structural member) restraint-welded by the TIG welding.

FIG. 4 is a graph where the dye penetrant test results of the lot of welding materials of the Ni-based alloy 690 including Examples of the present invention and Comparative Examples are outlined, by the sensitivity analysis using the neural network. This FIG. 4 shows a relationship between the content of S in each welding wire formed by the TIG welding and cracks detected by the side bend test. Referring to FIG. 4, it has been found that the number of cracks tends to transitionally increase when the content of S is in the range of 0.001 mass % (10 ppm) to 0.002 mass % (20 ppm). Thus, preferably, the content of S is set to be 15 ppm or less.

The content of Al is less than 0.01 mass %, and the content of Ti is less than 0.01 mass % in Comparative Example 4. Thus, the content of Al and the content of Ti do not satisfy the composition requirements of the present invention. Consequently, a remarkable cracking has occurred in the side bend test of the welded portion of the thick structural member, which does not satisfy the technical standards for welding (defined in the ministerial ordinance No. 81). In Comparative Example 5, the content of Al exceeds 0.7 mass %, and the content of Ti exceeds 0.7 mass %, and the content of Al and the content of Ti do not satisfy the composition requirements of the present invention. Thus, a scale was generated on the weld bead surface, as shown in Table 3. On contrast therewith, in each of Examples 1 to 16, the content of Al is in the range of 0.1 to 0.7%, and the content of Ti is in the range of 0.1 to 0.7%, and there is no scale generation on the weld bead surface (with good welding performance). Further, good weld cracking resistance was obtained.

Figure 5A:
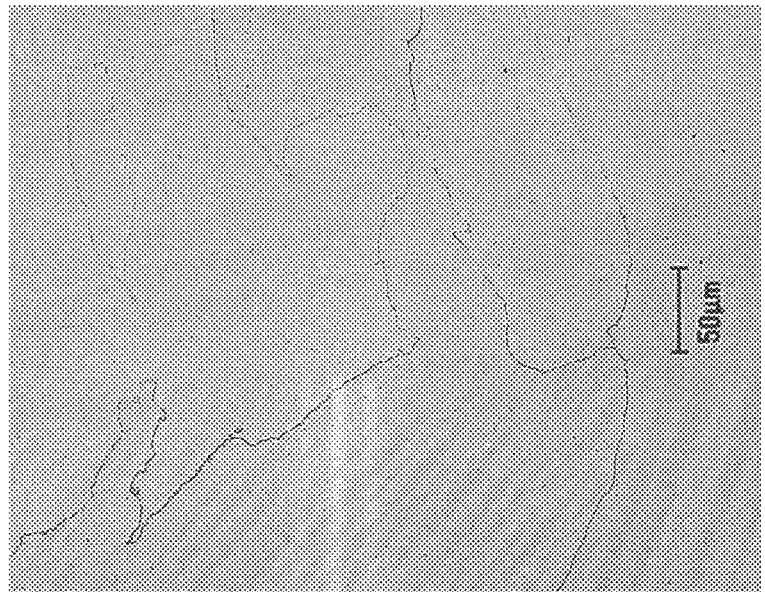
FIG. 5A is a structure photograph of a section of a welded metal formed by using the embodiment (Example 1) of the present invention taken by an optical microscope at a magnification of approximately 200.
Figure 5B:
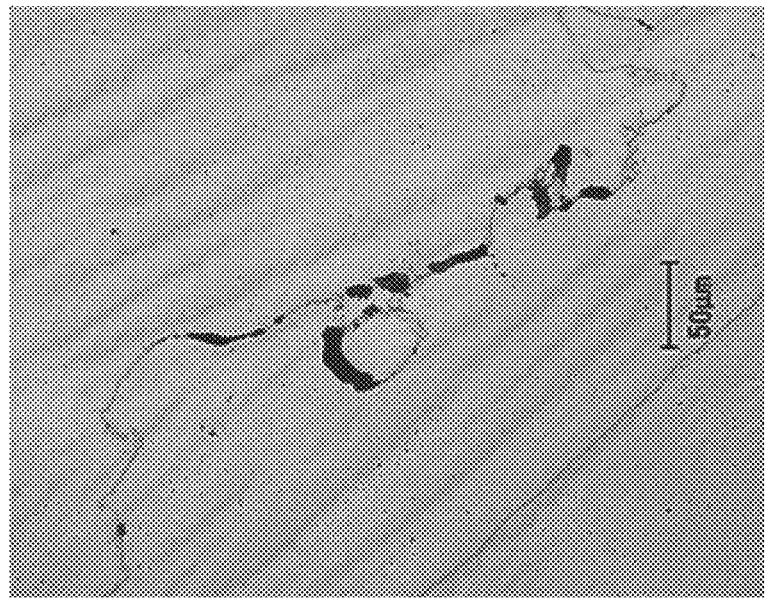
FIG. 5B is a structure photograph of a section of a welded metal formed by using a comparative example (Comparative Example 8) to the present invention taken by the optical microscope under the condition same as 5A.
Figure 6A:
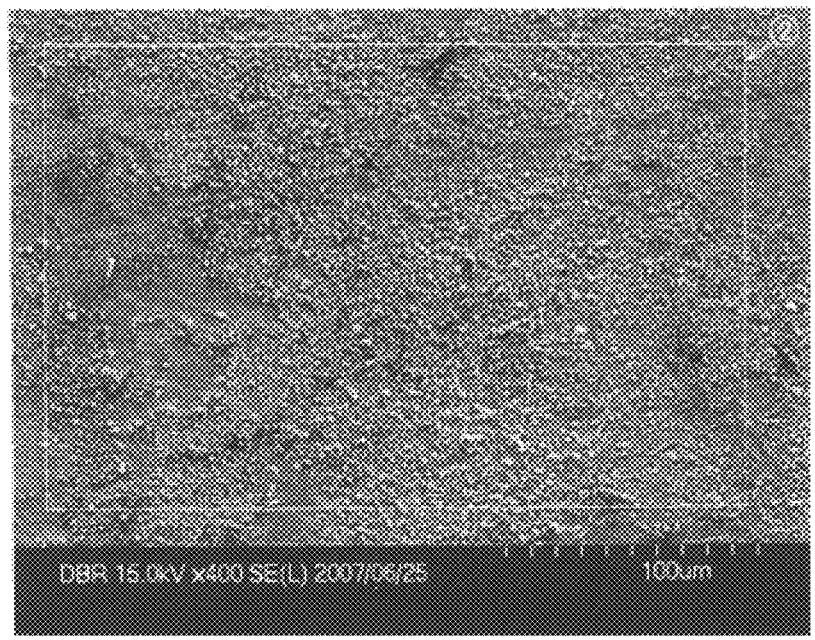
FIG. 6A is a photograph of a weld bead surface of Comparative Example 12 of the present invention taken by a scanning electron microscope (SEM) at a magnification of approximately 400.
Figure 6B:
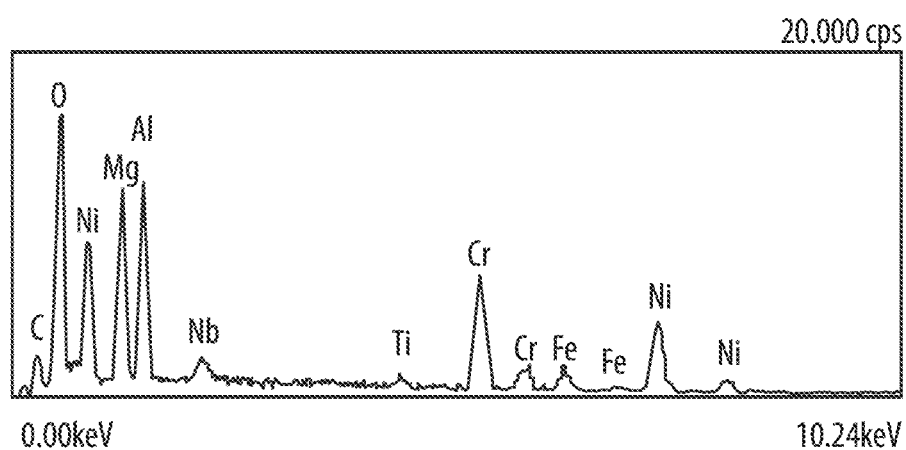
FIG. 6B is a graph showing a result of qualitative analysis of the weld bead surface using a scanning electron microscope-energy dispersive X-ray analysis (SEM-EDX).

The content of H exceeds 0.0015 mass % (15 ppm) in each of Comparative Examples 8 and 10, and does not therefore satisfy the composition requirement of the present invention. Thus, a microvoid as shown in FIG. 5B is generated, thereby impairing the integrity of the microstructure. On contrast therewith, the content of H is 0.0015 mass % (15 ppm) or less in each of Examples 1 to 16. Thus, it has been confirmed that the integrity of the microstructure of the welded metal is maintained, as shown in FIG. 5A. H is mixed into the welding wire when the welding wire is drawn as well as when the welding wire is melted. That is, when a lubricant is attached to the welding wire at the time of drawing the welding wire, the content of H remarkably increases. Thus, the lubricant must be fully washed away after the welding wire has been drawn. Comparative Example 12 is a welding wire that satisfies the conditions described in Patent Document 6 which is the related art. However, the content of Nb in Comparative Example 12 is high, and does not therefore satisfy the composition requirement of the present invention. Thus, a weld cracking was generated in the dye penetrant test of the build-up welded portion of the groove surface of the thick-walled plate, as shown in FIGS. 6A and 6B.

Though Ca+Mg as the inevitable impurity is not added to each of Examples 1 to 16 in Table 2, the content of Ca+Mg is reduced to be less than 0.002 mass % (20 ppm) in each of Examples 2 and 4 and Examples 9 to 12. When such an alloy composition is employed, scale generation on the bead surface may be remarkably inhibited, in addition to improvement in the tensile strength and weld cracking resistance of the welded portion and improvement in the integrity of the microstructure of the welded metal. The content of Ca+Mg in each of Comparative Examples 9, 10, and 12 exceeds 0.002 mass % (20 ppm), and does not therefore satisfy the composition requirement of the present invention. Consequently, a scale was generated on the build-up surface (weld bead surface) of multiple layers, as shown in FIG. 6A. Analysis of the chemical composition of this scale has shown that this scale is an oxide mainly comprising Mg, as shown in FIG. 6B. On contrast therewith, no scale was generated on the build-up surface of multiple layers in each of Examples 1 to 16. That is, in order to inhibit scale generation on the bead surface, preferably, Ca+Mg is not added, as in Examples 1 to 16, and the content of Ca+Mg is reduced to be less than 0.002 mass % (20 ppm).

An alloy composition where the content of Cu is 0.08 mass % or less, and the content of Co is 0.05 mass % or less is employed in each of Examples 1 to 16, as shown in Table 2. Assume that such an alloy composition is employed, and build-up welding is performed on the carbon steel plate. Then, weld cracking susceptibility does not increase due to reduction of the content of Cu, even if the dilution ratio has increased and a considerable amount of Fe is included in the build-up welded metal. Further, due to reduction of the content of Co, a radioactivity level in a working environment may be reduced when a periodic inspection or the like is carried out. On contrast therewith, the content of Cu in each of Comparative Examples 1 and 10 exceeds 0.08 mass %. Thus, when build-up welding is performed on the carbon steel plate and then the dilution ratio increases, weld cracking susceptibility cannot be reduced. The content of Co exceeds 0.05 mass % in Comparative Example 6. Thus, a radioactivity level in the working environment cannot be reduced when the periodic inspection or the like is carried out.

As shown in Table 2, each of Examples 3 to 7 has an alloy composition further including at least one kind of elements of B, Zr, and rare-earth elements (REM) of 0.02 mass % (200 ppm) or less in the alloy composition in each of Examples 1 and 2 and Examples 8 to 16 described above. With such an alloy composition is employed, an effect of further increasing the weld cracking resistance at the welded portion of the thick structural member may be obtained. On contrast therewith, each of Comparative Examples 1 to 8 and Comparative Example 11 does not include at least one kind of elements of B, Zr, and the rare-earth elements (does not include any of B, Zr, and the rare-earth elements). Thus, the effect of further increasing the weld cracking resistance like that in each of the examples 3 to 7 cannot be obtained.

When the high Cr Ni-based alloy welding wire in each of Examples 1 to 16 as described above is employed, the tensile strength and the weld cracking resistance of the welded portion, the integrity of the microstructure of the welded metal, and the welding performance (inhibition of scale generation) may be increased.

Next, an embodiment of a high Cr Ni-based shielded metal arc welding rod of the present invention will be described. Table 4 shows alloy compositions of welding wires used for high Cr Ni-based shielded metal arc welding rods of the present invention and alloy compositions of Comparative Examples for confirming an effect of the present invention.

TABLE 4

Chemical Compositions of Wires for Shielded Metal Arch Welding Rods (Mass %)

| | Wire Symbol | C (%) | Mn (%) | Fe (%) | P (ppm) | S (ppm) | Si (%) | Cu (%) | Ni (%) | Al (%) | Ti (%) | Cr (%) |
|---|---|---|---|---|---|---|---|---|---|---|---|---|
| Comparative Example 13 | S1 | 0.008 | 5.21 | 8.27 | 50 | 10 | 0.06 | 0.02 | Rem. | 0.56 | 0.65 | 27.5 |
| Comparative Example 14 | S2 | 0.008 | 5.25 | 7.76 | 60 | 7 | 0.12 | 0.01 | Rem. | 0.52 | 0.40 | 27.6 |
| Comparative Example 15 | S3 | 0.011 | 3.55 | 7.65 | 60 | 5 | 0.05 | 0.02 | Rem. | 1.22 | 0.45 | 27.7 |
| Comparative Example 16 | S4 | 0.012 | 1.30 | 8.84 | 60 | 6 | 0.05 | 0.04 | Rem. | 0.65 | 1.31 | 29.6 |
| Example 6 | Y6 | 0.016 | 0.35 | 8.58 | 110 | 4 | 0.32 | 0.02 | Rem. | 0.32 | 0.41 | 29.5 |
| Example 10 | Y10 | 0.021 | 0.45 | 8.43 | 30 | 6 | 0.15 | 0.02 | Rem. | 0.26 | 0.37 | 29.5 |
| Example 11 | Y11 | 0.032 | 0.38 | 8.41 | 40 | 4 | 0.26 | 0.01 | Rem. | 0.28 | 0.40 | 29.8 |
| Example 13 | Y13 | 0.022 | 0.93 | 9.84 | 50 | 10 | 0.26 | 0.03 | Rem. | 0.41 | 0.49 | 30.2 |
| Example 14 | Y14 | 0.029 | 1.12 | 6.54 | 60 | 10 | 0.32 | 0.02 | Rem. | 0.56 | 0.64 | 30.6 |
| Example 15 | Y15 | 0.016 | 1.22 | 7.42 | 80 | 12 | 0.28 | 0.01 | Rem. | 0.68 | 0.65 | 29.1 |
| Example 17 | S5 | 0.010 | 5.34 | 5.41 | 50 | 5 | 0.05 | 0.02 | Rem. | 0.52 | 0.82 | 29.1 |
| Example 18 | S6 | 0.011 | 2.11 | 2.13 | 60 | 6 | 0.06 | 0.03 | Rem. | 0.31 | 0.75 | 29.7 |
| Example 19 | S7 | 0.010 | 5.36 | 2.34 | 50 | 7 | 0.05 | 0.01 | Rem. | 0.29 | 0.97 | 27.5 |
| Example 20 | S8 | 0.012 | 1.22 | 2.66 | 70 | 10 | 0.04 | 0.04 | Rem. | 0.95 | 0.38 | 30.2 |
| Example 21 | S9 | 0.010 | 5.22 | 1.11 | 50 | 4 | 0.03 | 0.01 | Rem. | 0.72 | 0.40 | 27.5 |
| Example 22 | S10 | 0.012 | 3.06 | 5.32 | 30 | 8 | 0.06 | 0.02 | Rem. | 0.71 | 0.73 | 28.3 |

| | Nb (%) | Ta (%) | Mo (%) | Co (%) | O (ppm) | N (%) | H (ppm) | Ca + M (ppm) | B (ppm) | Zr (ppm) | REM (ppm) |
|---|---|---|---|---|---|---|---|---|---|---|---|
| Comparative Example 13 | 3.11 | 0.50 | 0.31 | 0.01 | 20 | 0.009 | 7 | — | — | — | — |
| Comparative Example 14 | 0.10 | 3.57 | 0.35 | 0.03 | 6 | 0.013 | 8 | 10 | — | — | — |
| Comparative Example 15 | 0.35 | 0.55 | 1.11 | 0.01 | 10 | 0.017 | 9 | — | — | — | — |
| Comparative Example 16 | 1.75 | 2.58 | 5.88 | 0.04 | 13 | 0.014 | 7 | — | — | — | — |
| Example 6 | 0.01 | 2.33 | 4.20 | 0.03 | 50 | 0.005 | 13 | — | 10 | 50 | 60 |
| Example 10 | 0.41 | 2.21 | 2.11 | 0.01 | 90 | 0.018 | 10 | 19 | — | — | — |
| Example 11 | 0.32 | 2.94 | 3.23 | 0.02 | 70 | 0.026 | 7 | 17 | — | — | — |
| Example 13 | 0.09 | 1.15 | 2.45 | 0.03 | 20 | 0.025 | 7 | — | — | — | — |
| Example 14 | 0.07 | 2.84 | 3.43 | 0.005 | 25 | 0.008 | 11 | — | — | — | — |
| Example 15 | 0.01 | 2.29 | 3.42 | 0.03 | 15 | 0.033 | 7 | — | — | — | — |
| Example 17 | 1.50 | 2.51 | 1.77 | 0.02 | 20 | 0.011 | 7 | 10 | — | — | — |
| Example 18 | 1.72 | 0.01 | 2.51 | 0.01 | 10 | 0.018 | 10 | — | — | — | — |
| Example 19 | 2.55 | 0.10 | 4.13 | 0.01 | 9 | 0.015 | 8 | — | — | — | — |
| Example 20 | 0.51 | 2.45 | 3.64 | 0.02 | 12 | 0.017 | 7 | — | — | — | — |
| Example 21 | 0.87 | 2.97 | 5.96 | 0.01 | 12 | 0.012 | 6 | 10 | — | — | — |
| Example 22 | 1.70 | 2.94 | 4.55 | 0.02 | 12 | 0.011 | 8 | — | — | — | — |

Referring to Table 4, each of Examples 6, 10, 11, 13 to 15, and 17 to 22 shows an example of the welding wire used for the high Cr Ni-based shielded metal arc welding rod of the present invention. Referring to Table 4, Examples 6, 10, 11, and 13 to 15 are obtained by selecting a part of the high Cr Ni-based welding wires of various alloy compositions shown in Table 2, as the wires for the shielded metal arc welding rods. Each of the examples shown in Table 4 has a composition comprising, by mass, C: 0.04% or less, Mn: 7% or less, Fe: 1 to 12%, Si: 0.75% or less, Al: 0.26 to 1.0%, Ti: 0.36 to 1.0%, Cr: 25.0 to 31.5%, Nb: 3.0% or less, Ta: 3.0% or less, and Mo: 1 to 6%, and as inevitable impurities, P: 0.02% or less, O: 0.01% or less, N: 0.1% or less, S: 0.0015% or less, H: 0.0015% or less, Cu: 0.08% or less, and Co: 0.05% or less, and the balance: Ni. By selecting a welding work condition whereby weld cracking susceptibility is reduced, the welding wire of the present invention may also be used for the TIG welding.

Table 5 shows results of welding performance tests of the shielded metal arc welding rods produced with the welding wires for the high Cr Ni-based alloy welding rods of various alloy compositions shown in Table 4. In the welding performance tests, each item of stability of an arc, spatter generation, slag encapsulation, slag detachability, slag burning, bead shape, and comprehensive evaluation of these items were evaluated with one of marks of ○ (good), Δ (passable), and X (bad).

The high Cr Ni-based alloy shielded metal arc welding rods in Examples 6-1, 10-1, 11-1, and 13-1 to 15-1 were respectively produced with the wires in Examples 6, 10, 11, and 13 to 15 in Table 4. The high Cr Ni-based alloy shielded metal arc welding rods in Examples 17-1 to 22-1 were respectively produced with the wires in Examples 17 to 22 in Table 4. As shown in Tables 4 and 5, a lime-type flux was used in each of these examples (Examples 6-1, 10-1, 11-1, 13-1 to 15-1, 17-1 to 22-1), for the reason that will be described later in detail.

The content of Nb in the wire in Comparative Example 13-1 exceeds 3.0 mass %, and does not therefore satisfy the composition requirement of the present invention. The content of Ta in the wire in Comparative Example 14-1 exceeds 3.0 mass %, and does not therefore satisfy the composition requirement of the present invention. Consequently, in the welding performance test for each of the shielded metal arc welding rods (in Comparative Examples 13-1 and 14-1) using the wires of Comparative Examples 13 and 14, slag burned on the bead surface of a welded portion. This burning may cause a defect in welding and may make it difficult to perform good welding, thus reducing welding performance. The content of Al in the wire of Comparative Example 15-1

TABLE 5

Wires Used for Shielded Metal Arc Welding Rods and Result of Welding Performance Test*

| | Wire Symbol | Flux Type | Arc Stability | Spatter Generation | Slag Encapsulation | Slag Detachability | Slag Burning | Bead Shape | Comprehensive Evaluation |
|---|---|---|---|---|---|---|---|---|---|
| Comparative Example 13-1 | S1 | Lime | ○ | ○ | ○ | ○ | X | ○ | X |
| Comparative Example 14-1 | S2 | Lime | ○ | ○ | ○ | ○ | X | ○ | X |
| Comparative Example 15-1 | S3 | Lime | ○ | ○ | ○ | X | Δ | ○ | X |
| Comparative Example 16-1 | S4 | Lime | ○ | ○ | ○ | X | Δ | ○ | X |
| Example 6-1 | Y6 | Lime | ○ | ○ | ○ | ○ | ○ | ○ | ○ |
| Example 10-1 | Y10 | Lime | ○ | ○ | ○ | ○ | ○ | ○ | ○ |
| Example 11-1 | Y11 | Lime | ○ | ○ | ○ | ○ | ○ | ○ | ○ |
| Example 13-1 | Y13 | Lime | ○ | ○ | ○ | ○ | ○ | ○ | ○ |
| Example 14-1 | Y14 | Lime | ○ | ○ | ○ | ○ | ○ | ○ | ○ |
| Example 15-1 | Y15 | Lime | ○ | ○ | ○ | ○ | ○ | ○ | ○ |
| Example 17-1 | S5 | Lime | ○ | ○ | ○ | ○ | ○ | ○ | ○ |
| Example 18-1 | S6 | Lime | ○ | ○ | ○ | ○ | ○ | ○ | ○ |
| Example 19-1 | S7 | Lime | ○ | ○ | ○ | ○ | ○ | ○ | ○ |
| Example 20-1 | S8 | Lime | ○ | ○ | ○ | ○ | ○ | ○ | ○ |
| Example 21-1 | S9 | Lime | ○ | ○ | ○ | ○ | ○ | ○ | ○ |
| Example 22-1 | S10 | Lime | ○ | ○ | ○ | ○ | ○ | ○ | ○ |

*Note: ○ Good Δ Passable X Bad

Each of Examples 6-1, 10-1, 11-1, 13-1 to 15-1, and 17-1 to 22-1 in Table 5 shows a result of the welding performance test of the shielded metal arc welding rod produced with the welding wire in this embodiment for the high Cr Ni-based alloy welding rod in Table 4 described above.

exceeds 1.0 mass %, and does not therefore satisfy the composition requirement of the present invention. The content of Ti in the wire of Comparative Example 16-1 exceeds 1.0 mass %, and does not therefore satisfy the composition requirement of the present invention. Consequently, in the welding performance test for each of the shielded metal arc welding rods (in Comparative Examples 15-1 and 16-1) using the welding wires of Comparative Examples 15 and 16, slag detachability was bad, thus posing a great problem for efficiently performing a welding work. Slag also burned a little bit (which was evaluated with the mark of Δ). On contrast therewith, Examples 6-1, 10-1, 11-1, 13-1 to 15-1, and 17-1 to 22-1 respectively show the shielded metal arc welding rods using the wires (of Examples 6, 10, 11, 13 to 15, and 17 to 22) that satisfy the composition requirements of the present invention and whose welding performances were good (were evaluated with the marks of ○).

Table 6 shows alloy compositions of weld metals of the examples formed by the high Cr Ni-based alloy shielded metal arc welding rods produced with the welding wires of the various alloy compositions and alloy compositions of Comparative Examples for confirming the effect of the present invention.

TABLE 6

Combinations of Wires and Flux Types Used for Shielded Metal Arc Welding Rods and Chemical Compositions of Weld Metals (Mass %)

| | Wire Symbol | Flux Type | C (%) | Mn (%) | Fe (%) | P (ppm) | S (ppm) | Si (%) | Cu (%) | Ni (%) | Al (%) | Ti (%) | Cr (%) |
|---|---|---|---|---|---|---|---|---|---|---|---|---|---|
| Comparative Example 13-1 | S1 | Lime | 0.030 | 4.32 | 8.32 | 60 | 15 | 0.27 | <0.01 | Rem. | 0.13 | 0.12 | 28.09 |
| Comparative Example 14-1 | S2 | Lime | 0.031 | 4.33 | 7.68 | 60 | 20 | 0.30 | 0.01 | Rem. | 0.11 | 0.11 | 28.27 |
| Comparative Example 15-1 | S3 | Lime | 0.032 | 3.81 | 9.10 | 60 | 20 | 0.22 | 0.02 | Rem. | 0.35 | 0.25 | 28.41 |
| Comparative Example 15-2 | S3 | Lime-Titania | 0.019 | 3.21 | 9.10 | 60 | 60 | 0.41 | 0.05 | Rem. | 0.20 | 0.02 | 28.21 |
| Comparative Example 16-2 | S4 | Lime-Titania | 0.021 | 4.28 | 8.84 | 60 | 20 | 0.45 | 0.04 | Rem. | 0.06 | 0.03 | 29.86 |
| Comparative Example 17-2 | Y22 | Lime-Titania | 0.034 | 2.32 | 8.50 | 50 | 60 | 0.26 | 0.09 | Rem. | 0.08 | 0.15 | 29.65 |
| Example 6-1 | Y6 | Lime | 0.031 | 2.10 | 8.34 | 80 | 10 | 0.25 | 0.03 | Rem. | 0.20 | 0.13 | 29.30 |
| Example 10-1 | Y10 | Lime | 0.034 | 0.81 | 8.14 | 50 | 45 | 0.15 | 0.02 | Rem. | 0.08 | 0.08 | 29.80 |
| Example 11-1 | Y11 | Lime | 0.039 | 0.69 | 8.25 | 40 | 10 | 0.25 | 0.02 | Rem. | 0.09 | 0.08 | 29.22 |
| Example 13-1 | Y13 | Lime | 0.031 | 0.91 | 8.81 | 40 | 10 | 0.25 | 0.02 | Rem. | 0.08 | 0.08 | 29.27 |
| Example 14-1 | Y14 | Lime | 0.034 | 1.81 | 7.22 | 70 | 10 | 0.26 | 0.02 | Rem. | 0.10 | 0.11 | 29.13 |
| Example 15-1 | Y15 | Lime | 0.030 | 2.65 | 5.03 | 50 | 20 | 0.24 | 0.02 | Rem. | 0.13 | 0.12 | 30.25 |
| Example 17-1 | S5 | Lime | 0.030 | 4.45 | 6.13 | 40 | 15 | 0.11 | 0.03 | Rem. | 0.10 | 0.15 | 29.18 |
| Example 17-2 | S5 | Lime | 0.031 | 4.32 | 6.22 | 50 | 15 | 0.13 | 0.04 | Rem. | 0.14 | 0.16 | 29.45 |
| Example 22-1 | S10 | Lime | 0.032 | 3.12 | 5.95 | 30 | 10 | 0.14 | 0.01 | Rem. | 0.14 | 0.16 | 28.77 |

| | Nb (%) | Ta (%) | Mo (%) | Co (%) | O (%) | N (%) | H (ppm) | Ca + Mg (ppm) | B (ppm) | Zr (ppm) | REM (ppm) |
|---|---|---|---|---|---|---|---|---|---|---|---|
| Comparative Example 13-1 | 2.77 | 0.40 | 0.58 | 0.02 | 0.07 | 0.020 | 10 | — | — | — | — |
| Comparative Example 14-1 | 0.37 | 2.87 | 0.55 | <0.01 | 0.06 | 0.018 | 12 | — | — | — | — |
| Comparative Example 15-1 | 0.21 | 0.48 | 1.21 | <0.01 | 0.07 | 0.022 | 15 | — | — | — | — |
| Comparative Example 15-2 | 0.15 | 0.33 | 1.09 | 0.04 | 0.07 | 0.020 | 22 | — | — | — | — |
| Comparative Example 16-2 | 2.54 | 4.45 | 6.31 | 0.04 | 0.07 | 0.018 | 25 | — | — | — | — |
| Comparative Example 17-2 | 0.75 | 2.17 | 3.87 | 0.06 | 0.07 | 0.018 | 23 | — | — | — | — |
| Example 6-1 | 0.56 | 3.51 | 4.20 | 0.01 | 0.07 | 0.035 | 15 | — | 20 | 20 | 10 |
| Example 10-1 | 1.11 | 3.30 | 5.63 | 0.01 | 0.07 | 0.015 | 12 | — | 20 | — | — |
| Example 11-1 | 0.15 | 2.61 | 2.93 | 0.02 | 0.08 | 0.033 | 15 | 10 | — | — | — |

TABLE 6-continued

Combinations of Wires and Flux Types Used for Shielded Metal Arc Welding Rods and Chemical Compositions of Weld Metals (Mass %)

| | | | | | | | | | | | |
|---|---|---|---|---|---|---|---|---|---|---|---|
| Example 13-1 | 0.03 | 1.80 | 3.92 | 0.02 | 0.08 | 0.033 | 15 | — | — | — | — |
| Example 14-1 | 0.75 | 2.04 | 3.12 | 0.03 | 0.07 | 0.033 | 15 | — | — | — | — |
| Example 15-1 | 0.95 | 3.30 | 2.77 | 0.03 | 0.07 | 0.025 | 10 | — | — | — | — |
| Example 17-1 | 1.71 | 1.93 | 1.36 | 0.02 | 0.07 | 0.021 | 15 | 10 | — | — | — |
| Example 17-2 | 1.22 | 2.21 | 3.51 | 0.01 | 0.07 | 0.034 | 10 | — | — | — | — |
| Example 22-1 | 1.33 | 0.52 | 4.03 | 0.01 | 0.07 | 0.02 | 10 | — | — | — | — |

Examples 6-1, 10-1, 11-1, 13-1 to 15-1, 17-1, 17-2, and 22-1 in Table 6 show the alloy compositions of the weld metals of high Cr Ni-based alloys formed by shielded metal arc welding in this embodiment. The high Cr Ni-based alloy weld metals formed by the shielded metal arc welding in Examples 6-1, 10-1, 11-1, 13-1 to 15-1, 17-1, 17-2, and 22-1 were formed by the shielded metal arc welding rods produced with the wires (in Examples 6, 10, 11, 13 to 15, 17, and 22) selected from among the welding wires for the high Cr Ni-based shielded metal arc welding rods in Table 4 described above. The weld metals in the examples shown in FIG. 6 each comprises, by mass, C: 0.04% or less, Mn: 7% or less, Fe: 1 to 12%, Si: 0.75% or less, Al: 0.01 to 0.7%, Ti: 0.01 to 0.7%, Cr: 25.0 to 31.5%, Nb+Ta: 1.8 to 4.5%, Mo: 1 to 6%, and as inevitable impurities, Ca+Mg: less than 0.002%, P: 0.02% or less, S: 0.005% or less, H: 0.002% or less, N: 0.1% or less, O: 0.1% or less, Cu: 0.08% or less, and Co: 0.05% or less, and the balance: Ni.

Table 7 shows evaluation results obtained after execution of tests of welding performances of the high Cr Ni-based alloy shielded metal arc welding rods of various alloy compositions shown in Table 6, tensile tests of the weld metals, side bend tests of welded metal portions of thick structural members, and check tests of microstructures of welded metals.

TABLE 7

Evaluation of Characteristics of Shielded Metal Arc Welding Rods

| | Comprehensive Evaluation of Welding Performance* | Tensile Strength (MPa) Test Temperature (° C.) | | Result of Side Bend Test on Welded Portion of Thick Structural Member | | | Presence of Absence of Microvoid in Welded Metal Structure |
|---|---|---|---|---|---|---|---|
| | | Room Temp. | 350 | Total Cracking Length (mm) | No. of Defects | Pass/Fail** | |
| Comparative Example 13-1 | X | 612 | 484 | 7.8 | 11 | Fail | None |
| Comparative Example 14-1 | X | 600 | 481 | 6.5 | 9 | Pass | None |
| Comparative Example 15-1 | X | 577 | 466 | 6.5 | 7 | Pass | None |
| Comparative Example 15-2 | X | 575 | 465 | 17.1 | 20 | Fail | Present |
| Comparative Example 16-2 | X | 808 | 580 | 21.3 | 24 | Fail | Present |
| Comparative Example 17-2 | ○ | 728 | 558 | 18.9 | 23 | Fail | Present |
| Example 6-1 | ○ | 731 | 565 | 3.3 | 5 | Pass | None |
| Example 10-1 | ○ | 755 | 578 | 6.9 | 10 | Pass | None |
| Example 11-1 | ○ | 702 | 551 | 1.0 | 2 | Pass | None |
| Example 13-1 | ○ | 646 | 516 | 1.8 | 3 | Pass | None |
| Example 14-1 | ○ | 715 | 554 | 2.2 | 4 | Pass | None |
| Example 15-1 | ○ | 741 | 566 | 4.2 | 5 | Pass | None |
| Example 17-1 | ○ | 718 | 559 | 4.3 | 5 | Pass | None |
| Example 17-2 | ○ | 729 | 560 | 4.9 | 7 | Pass | None |
| Example 22-1 | ○ | 633 | 510 | 3.2 | 5 | Pass | None |

*Note: ○ Good Δ Passable X Bad
**Notes (Ministerial Ordinance No. 81): (1) A crack should not exceed 3 mm in length (except those occurring at edge corners of a test piece). (2) The total length of cracks having a length of 3 mm or less should not exceed 7 mm. (3) The number of cracks and/or blowholes should not exceed 10.

The welding wires (in Comparative Examples 13, 14, 15, and 16 shown in Table 4) used for producing the welding rods in Comparative Examples 13-1 to 15-1 and Comparative Examples 15-2 and 16-2 do not satisfy the composition requirements of the present invention. Thus, there is a problem of degradation of the welding performances of Comparative Examples 13-1 to 15-1 and Comparative Examples 15-2 and 16-2 (see Table 5).

The content of Nb+Ta in the weld metal in each of Comparative Examples 15-1 and 15-2 is low, and does not therefore satisfy the composition requirement of the present invention. The content of Mo in each of Comparative Examples 13-1 and 14-1 is low, and does not therefore satisfy the composition requirement of the present invention. Consequently, tensile strength at 350° C. in each of Comparative Examples 13-1, 14-1, 15-1, and 15-2 was less than 485 MPa. That is, as compared with Examples 6-1, 10-1, 11-1, 13-1 to 15-1, 17-1, 17-2, and 22-1 that compositely include Nb+Ta and Mo, a satisfactory tensile characteristic cannot obtained from Comparative Examples 13-1, 14-1, 15-1, and 15-2.

The content of Nb+Ta in Comparative Example 16-2 exceeds 4.5 mass %, and does not therefore satisfy the composition requirement of the present invention. For that reason, the total length of cracks exceeded 7 mm and the number of the cracks exceeded 10 pieces in the side bend test of the welded metal portion of the thick structural member in Comparative Example 16-2. Thus, preferably, the weld metal in Comparative Example 16-2 includes Nb to of 1.8 to 4.5 mass % or less and Mo of 1 to 6 mass %, as in each of Examples 6-1, 10-1, 11-1, 13-1 to 15-1, 17-1, 17-2, and 22-1.

The content of S in each of Comparative Examples 15-2 and 17-2 exceeds 0.005 mass % (50 ppm), and does not therefore satisfy the composition requirement of the present invention. For that reason, the total length of cracks exceeded 7 mm and the number of cracks exceeded 10 pieces in the side bend test of the welded metal portion of the thick structural member. The total length of cracks and the number of cracks do not satisfy the technical standards for welding (defined in the ministerial ordinance No. 81). On contrast therewith, each of Examples 6-1, 10-1, 11-1, 13-1 to 15-1, 17-1, 17-2, and 22-1 whose content of S is 0.005 mass % or less (50 ppm) satisfies the technical standards for welding (defined in the ministerial ordinance No. 81). Thus, preferably, the content of S in the weld metal formed by using the shielded metal arc welding rod of the present invention is set to 0.005 mass % (50 ppm) or less as in Examples 6-1, 10-1, 11-1, 13-1 to 15-1, 17-1, 17-2, and 22-1.

As described above, the influence of a flux and presence of Mn need to be taken into consideration in the case of shielded metal arc welding. For that reason, the content of S in the weld metal (in each of Examples 6-1, 10-1, 11-1, 13-1 to 15-1, 17-1, 17-2, and 22-1) formed by using the shielded metal arc welding rod in this embodiment is 0.005 mass % (50 ppm) or less, while the content of S in each of the welding wires (in Examples 1 to 16 and Examples 17 to 22) described above is 0.0015 mass % (15 ppm) or less. Accordingly, the content of S acts on the total length of cracks generated in the side bend test for the welded portion of the thick structural member differently from the action shown in FIG. 4 indicating the case of the TIC welding.

The content of H in each of Comparative Examples 15-2, 16-2, and 17-2 exceeds 0.002 mass 1 (20 ppm), and does not therefore satisfy the composition requirement of the present invention. Thus, a microvoid was generated in the welded metal. In addition, the number of cracks exceeded 10 pieces in the side bend test of the welded metal portion of the thick structural member in each of Comparative Examples 15-2, 16-2, and 17-2, and does not therefore satisfy the technical standards for welding (defined in the ministerial ordinance No. 81). As described above, moisture absorbed by the flux in the shielded metal arc welding generates hydrogen. Thus, the content of H in a welded metal formed by the shielded metal arc welding tends to be higher than that formed by the TIG welding. Generally, as flux types for a high Cr Ni-based alloy shielded metal arc welding rod, a lime-titania type mainly comprising $TiO_2$, $CaCO_3$, and $CaF_2$ and a lime-type mainly comprising $CaCO_3$ and $CaF_2$ are present. Out of these flux types, the lime-type flux was used for the shielded metal arc welding rod of the present invention. The reason for the use of the lime-type flux is that the partial pressure of H decreases due to a gas component such as $CO_2$ to be generated from $CaCO_3$ at a time of welding, so that the content of H in the welded metal decreases more than with the other flux type. The $CaF_2$ component of the flux is melted into a molten slag during the welding, and then reacts with a molten metal, thereby controlling an increase of S and the like. Thus, the use of the lime-type flux is also effective for increasing weld cracking resistance.

The lime-titania type flux was used in Comparative Examples 15-2, 16-2, and 17-2. The content of H in each of Comparative Examples 15-2, 16-2, and 17-2 using such a lime-titania type flux exceeds 0.002 mass % (20 ppm), as described above. Thus, the microvoid was generated in the welded metal. For this reason, preferably, the lime-type flux is used, as in Examples 6-1, 10-1, 11-1, 13-1 to 15-1, 17-1, 17-2, and 22-1, thereby controlling the content of H to be 0.002 mass % or less.

The content of Cu in Comparative Example 17-2 exceeds 0.08 mass %. Thus, weld cracking susceptibility cannot be reduced when the dilution ratio increases after build-up welding has been performed on a carbon steel plate. The content of Co in Comparative Example 17-2 exceeds 0.05 mass %. Thus, a radioactivity level in the working environment cannot be reduced when the periodic inspection or the like is carried out.

The welding performance of the high Cr Ni-based alloy shielded arc welding rod having the alloy composition in each of Examples 6-1, 10-1, 11-1, 13-1 to 15-1, 17-1, 17-2, and 22-1 is good. In the welded metal formed by each of these welding rods, tensile strength and weld cracking resistance of the welded portion and the integrity of the microstructure of the welded metal may be increased all together.

INDUSTRIAL APPLICABILITY

According to the present invention, the tensile strength characteristic and the weld cracking resistance of a welded portion and the integrity of the microstructure of a welded metal may be increased by configuring a high Cr Ni-based alloy welding wire to have an alloy composition comprising, by mass, C: 0.04% or less, Mn: 7% or less, Fe: 1 to 12%, Si: 0.75% or less, Al: 0.01 to 0.7%, Ti: 0.01 to 0.7%, Cr: 25.0 to 31.5%, Ta: 1 to Mo: 1 to 6%, and N: 0.1% or less, and as inevitable impurities, P: or less, O: 0.01% or less, S: 0.0015% or less, H: 0.0015% or less, Cu: 0.08% or less, and Co: 0.05% or less, and the balance: Ni, and by configuring such that the contents of S, Ta, Al, Ti, Mo, and N to satisfy the following relations (1) and (2):

$$12000S+0.58Ta-2.6Al-2Ti \leq 19.3 \quad (1)$$

$$Ta+1.6Mo+187N \geq 5.7 \quad (2).$$

The invention claimed is:

1. A high Cr Ni-based alloy welding wire comprising, by mass, C: 0.006% to 0.04%, Mn: 0.05% to 7%, Fe: 1 to 12%, Si: 0.05% to 0.75%, Al: 0.01 to 0.7%, Ti: 0.01 to 0.7%, Cr: 25.0 to 31.5%, Ta: 1 to 10%, Nb: 0%, and Mo: 1 to 6%, and as inevitable impurities, Ca+Mg: less than 0.002%, N: 0.1% or less, P: 0.02% or less, O: 0.01% or less, S: 0.0015% or less, H: 0.0015% or less, Cu: 0.08% or less, and Co: 0.05% or less, and the balance: Ni, contents of S, Ta, Al, and Ti satisfying the following relation (1) and contents of Ta, Mo, and N satisfying the following relation (2):

$$12000S+0.58Ta-2.6Al-2Ti \leq 19.3 \quad (1)$$

$$Ta+1.6Mo+187N \geq 5.7 \quad (2).$$

2. The high Cr Ni-based alloy welding wire according to claim 1, wherein the content of Al is 0.26 to 0.7 mass %.

3. The high Cr Ni-based alloy welding wire according to claim 1, wherein the content of Ti is 0.36 to 0.7 mass %.

4. The high Cr Ni-based alloy welding wire according to claim 1, further comprising, by mass, at least one element selected from B, Zr, and rare earth elements: 0.0065% to 0.02%.

5. The high Cr Ni-based alloy welding wire according to claim 1, wherein the content of Ca+Mg is 0.0016% or less.

6. A high Cr Ni-based alloy welding wire comprising, by mass, C: 0.006% to 0.04%, Mn: 0.05% to 7%, Fe: 1 to 12%, Si: 0.05% to 0.75%, Al: 0.01 to 0.7%, Ti: 0.01 to 0.7%, Cr: 25.0 to 31.5%, Ta: 1 to 10%, Nb: 0%, and Mo: 1 to 6%, and as inevitable impurities, N: 0.1% or less, P: 0.02% or less, O: 0.01% or less, S: 0.0015% or less, H: 0.0015% or less, Cu: 0.08% or less, and Co: 0.05% or less, and the balance: Ni, wherein Ca and Mg are not present in detectable amounts, contents of S, Ta, Al, Ti, Mo, and N satisfying the following relations (1) and (2):

$$12000S+0.58Ta-2.6Al-2Ti \leq 19.3 \quad (1)$$

$$Ta+1.6Mo+187N \geq 5.7 \quad (2).$$

7. The high Cr Ni-based alloy welding wire according to claim 6, wherein the content of Al is 0.26 to 0.7 mass %.

8. The high Cr Ni-based alloy welding wire according to claim 6, wherein the content of Ti is 0.36 to 0.7 mass %.

9. The high Cr Ni-based alloy welding wire according to claim 6, further comprising, by mass, at least one element selected from B, Zr, and rare earth elements: 0.001% to 0.02%.

* * * * *